(12) United States Patent
Horiuchi et al.

(10) Patent No.: US 10,932,252 B2
(45) Date of Patent: Feb. 23, 2021

(54) RECEIVER DEVICE, TRANSMITTER DEVICE, RECEPTION METHOD, AND TRANSMISSION METHOD

(71) Applicant: Sun Patent Trust, New York, NY (US)

(72) Inventors: Ayako Horiuchi, Kanagawa (JP); Hidetoshi Suzuki, Kanagawa (JP); Akihiko Nishio, Osaka (JP); Masayuki Hoshino, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

(21) Appl. No.: 16/865,178

(22) Filed: May 1, 2020

(65) Prior Publication Data

US 2020/0260426 A1 Aug. 13, 2020

Related U.S. Application Data

(63) Continuation of application No. 16/429,245, filed on Jun. 3, 2019, now Pat. No. 10,687,327, which is a
(Continued)

(30) Foreign Application Priority Data

Feb. 16, 2012 (JP) .................................. 2012-031653
Mar. 13, 2012 (JP) .................................. 2012-055433

(51) Int. Cl.
*H04W 72/04* (2009.01)
*H04B 7/0417* (2017.01)
(Continued)

(52) U.S. Cl.
CPC ........ *H04W 72/042* (2013.01); *H04B 7/0417* (2013.01); *H04B 7/0456* (2013.01);
(Continued)

(58) Field of Classification Search
CPC .. H04W 72/042; H04W 16/28; H04B 7/0417; H04B 7/068; H04B 7/0689;
(Continued)

(56) References Cited

U.S. PATENT DOCUMENTS 8,995,368 B2 * 3/2015 Moon ................... H04L 5/0091
370/329
9,119,196 B2 8/2015 Nishio et al.
(Continued)

FOREIGN PATENT DOCUMENTS

EP 1944896 A1 7/2008
KR 10-2011-0086246 A 7/2011
(Continued)

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011 101 pages.
(Continued)

*Primary Examiner* — Hirdepal Singh
(74) *Attorney, Agent, or Firm* — Seed IP Law Group LLP

(57) ABSTRACT

Provided is a receiver device that can switch between transmission methods, while minimizing increase in the number of blind decryption iterations and the amount of signaling needed for acknowledgement. In this device, a receiver part (201) receives a signal mapped to any of a plurality of mapping candidates; and according to application levels established for each of the plurality of mapping candidates, a control signal processor (205) performs blind decryption of the plurality of mapping candidates, employing either a first transmission method using a single antenna port to carry out precoding based on feedback information from the receiver device, or a second transmission method
(Continued)

involving transmission diversity employing multiple antenna ports.

11 Claims, 22 Drawing Sheets

Related U.S. Application Data continuation of application No. 16/057,428, filed on Aug. 7, 2018, now Pat. No. 10,681,688, which is a continuation of application No. 15/254,844, filed on Sep. 1, 2016, now Pat. No. 10,075,945, which is a continuation of application No. 14/976,932, filed on Dec. 21, 2015, now Pat. No. 9,484,996, which is a continuation of application No. 14/374,177, filed as application No. PCT/JP2013/000551 on Feb. 1, 2013, now Pat. No. 9,252,861.

(51) Int. Cl.

| | | |
|---|---|---|
| *H04B 7/06* | (2006.01) | |
| *H04L 5/00* | (2006.01) | |
| *H04B 7/0456* | (2017.01) | |
| *H04W 16/28* | (2009.01) | |
| *H04L 25/02* | (2006.01) | |
| *H04L 27/26* | (2006.01) | |

(52) U.S. Cl.
CPC .......... *H04B 7/068* (2013.01); *H04B 7/0619* (2013.01); *H04B 7/0671* (2013.01); *H04B 7/0689* (2013.01); *H04L 5/0053* (2013.01); *H04L 5/0035* (2013.01); *H04L 25/0206* (2013.01); *H04L 27/2646* (2013.01); *H04L 27/2649* (2013.01); *H04W 16/28* (2013.01)

(58) Field of Classification Search
CPC .. H04B 7/0619; H04B 7/0671; H04B 7/0456; H04L 5/0053; H04L 27/2646; H04L 25/0206; H04L 27/2649; H04L 5/0035
USPC ......................................................... 370/329
See application file for complete search history.

(56) References Cited

U.S. PATENT DOCUMENTS

| | | | |
|---|---|---|---|
| 9,516,636 | B2 | 12/2016 | Park et al. |
| 9,544,107 | B2 | 1/2017 | Chun et al. |
| 9,843,429 | B2 | 12/2017 | Yi et al. |
| 2009/0201869 | A1 | 8/2009 | Xu et al. |
| 2011/0076962 | A1 | 3/2011 | Chen et al. |
| 2011/0085513 | A1 | 4/2011 | Chen et al. |
| 2012/0281555 | A1* | 11/2012 | Gao ..................... H04L 5/0051 370/252 |
| 2012/0320782 | A1 | 12/2012 | Seo et al. |
| 2013/0010682 | A1* | 1/2013 | Kim .................. H04W 72/1289 370/315 |
| 2013/0016655 | A1 | 1/2013 | Heo et al. |
| 2013/0022005 | A1 | 1/2013 | Yano et al. |
| 2013/0039284 | A1 | 2/2013 | Marinier et al. |
| 2013/0044727 | A1 | 2/2013 | Nory et al. |
| 2013/0107822 | A1 | 5/2013 | Papasakellariou et al. |
| 2013/0114521 | A1 | 5/2013 | Frenne et al. |
| 2013/0155869 | A1 | 6/2013 | Wu |
| 2013/0301587 | A1 | 11/2013 | Luo et al. |
| 2014/0050159 | A1 | 2/2014 | Frenne et al. |
| 2014/0056279 | A1 | 2/2014 | Chen et al. |
| 2014/0071934 | A1 | 3/2014 | Frenne et al. |
| 2014/0146768 | A1* | 5/2014 | Seo ..................... H04W 72/042 370/329 |
| 2014/0247775 | A1 | 9/2014 | Frenne et al. |
| 2014/0254533 | A1* | 9/2014 | Kim ..................... H04B 7/0413 370/329 |
| 2014/0286275 | A1 | 9/2014 | Park et al. |
| 2014/0286281 | A1 | 9/2014 | Jang et al. |
| 2014/0293924 | A1* | 10/2014 | Wang .................. H04W 72/042 370/329 |
| 2014/0293942 | A1 | 10/2014 | Kang et al. |
| 2014/0301238 | A1 | 10/2014 | Chun et al. |
| 2014/0307729 | A1 | 10/2014 | Son et al. |
| 2014/0314042 | A1 | 10/2014 | Kim et al. |
| 2014/0341146 | A1 | 11/2014 | Nakashima et al. |
| 2014/0348103 | A1 | 11/2014 | Kim et al. |
| 2014/0362832 | A1 | 12/2014 | Rudolf et al. |
| 2015/0023266 | A1 | 1/2015 | Imamura et al. |
| 2017/0171845 | A1 | 6/2017 | Seo et al. |
| 2017/0238288 | A1* | 8/2017 | Chen ....................... H04W 4/70 370/329 |
| 2019/0123875 | A1 | 4/2019 | Guan et al. |

FOREIGN PATENT DOCUMENTS

| | | |
|---|---|---|
| WO | 2011/038405 A2 | 3/2011 |
| WO | 2011/044494 A1 | 4/2011 |
| WO | 2011/053851 A2 | 5/2011 |
| WO | 2011/071310 A2 | 6/2011 |
| WO | 2011/145864 A2 | 11/2011 |

OTHER PUBLICATIONS

3GPP TS 36.212 V10.4.0 "3rd Generation Partnership Project; Technical Specification Group Radio Access Network; Evolved Universal Terrestrial Radio Access (E-UTRA); Multiplexing and channel coding (Release 10)," Dec. 2011, 79 pages.

3GPP TS 36.216 V10.1.0 "3rd Generation Partnership Project; Technical Specification Group Radio Access Network; Evolved Universal Terrestrial Radio Access (E-UTRA); Physical layer for relaying operation (Release 10)," Dec. 2010, 15 pages.

Catt, "E-PDCCH multiplexing and link level evaluations," R1-113744, Agenda Item: 7.7.4, 3GPP TSG AN WG1 Meeting #67, San Francisco, USA, Nov. 14-18, 2011, 5 pages.

Ericsson et al, "On multiplexing of DCI messages," R1-120078, Agenda Item: 7.6.4, 3GPP TSG-RAN WG1 #68, Dresden, Germany, Feb. 6-10, 2012, 5 pages.

Ericsson et al., "On reference signal design for enhanced control channels," R1-120076, Agenda Item: 7.6.1, 3GPP TSG-RAN WG1 #68, Dresden, Germany, Feb. 6-10, 2012, 4 pages.

Fujitsu, "Discussion on signaling mechanisms for E-PDCCH," R1-120763, Agenda Item: 7.6.5, 3GPP TSG RAN WG1 #68, Dresden, Germany, Feb. 6-10, 2012, 4 pages.

InterDigital Communications, LLC, "Reference Signals for ePDCCH," R1-120138, Agenda Item: 7.6.1, 3GPP TSG RAN WG1 Meeting #68, Dresden, Germany, Feb. 6-10, 2012, 6 pages.

International Search Report, dated Apr. 16, 2013 for corresponding International Application No. PCT/JP2013/000551, 4 pages.

LG Electronics, "Discussion on Multiplexing of DCI Messages," R1-120453, Agenda Item: 7.6.4, 3GPP TSG RAN WG1 Meeting #68, Dresden, Germany, Feb. 6-10, 2012, 4 pages.

LG Electronics, "Resource Allocation for SORTD," R1-102717, Agenda Item: 6.2.4.2, 3GPP TSG RAN WG1 #61, Montreal, Canada, May 10-14, 2010, 6 pages.

Panasonic, "DCI format and blind decoding for LTE-Advanced," R1-093941, Agenda Item: 7.2.2.3, 3GPP TSG-RAN WG1 Meeting #58bis, Miyazaki, Japan, Oct. 12-16, 2009, 5 pages.

Samsung, "DM-RS based Distributed and Localized E-PDCCH structure," R1-114396, Agenda Item: 7.7.1, 3GPP TSG RAN WG1 #67, San Francisco, USA, Nov. 14-28, 2011, 4 pages.

Samsung, "Further discussion on E-PDCCH structure," R1-120187, Agenda Item: 7.6.1, 3GPP TSG RAN WG1 #68, Dresden, Germany, Feb. 6-10, 2012, 6 pages.

* cited by examiner

| | NUMBER OF BITS NECESSARY TO INDICATE PARAMETER IN EACH ePDCCH CANDIDATE | NUMBER OF BITS NECESSARY TO INDIVIDUALLY INDICATE PARAMETERS TO ALL ePDCCH CANDIDATES (N CANDIDATES) (ASSUMING N=32) |
|---|---|---|
| DCI format | 1 bit (DCI format 1A/0 or TM specific DL DCI format) or 2 bit (DCI format 1A/0 or TM specific DL DCI format, DCI format 4) | 32 bits or 64 bits |
| Aggregation level 1,2,4,8 | 2 bits | 64 bits |
| Tx diversity or not | 1 bit | 32 bits |
| Antenna port 7,8,9,10 | 2 bits | 64 bits |
| Localized or Distributed | 1 bit | 32 bits |

FIG. 4

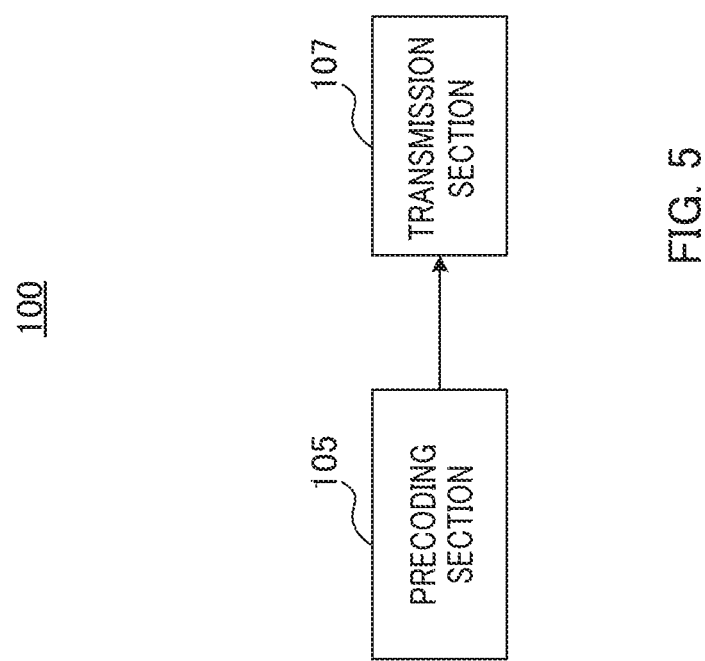

|  | One port | TRANSMISSION DIVERSITY |
|---|---|---|
| 00 | Port #7 | Port #7, #8 |
| 01 | Port #8 | Port #7, #8 |
| 10 | Port #9 | Port #9, #10 |
| 11 | Port #10 | Port #9, #10 |

FIG. 13

|  | Aggregation level 1/2 | Aggregation level 4/8 |
|---|---|---|
| 00 | Port #7 | Port #7 |
| 01 | Port #8 | Port #7 |
| 10 | Port #9 | Port #9 |
| 11 | Port #10 | Port #9 |

FIG. 21

RECEIVER DEVICE, TRANSMITTER DEVICE, RECEPTION METHOD, AND TRANSMISSION METHOD

BACKGROUND

Technical Field

The present invention relates to a reception apparatus, a transmission apparatus, a reception method and a transmission method.

Description of the Related Art

In recent years, accompanying the adoption of multimedia information in cellular mobile communication systems, it has become common to transmit not only speech data but also a large amount of data such as still image data and moving image data.

Furthermore, studies have been actively conducted in LTE-Advanced (Long Term Evolution Advanced) to realize high transmission rates by utilizing broad radio bands, Multiple-Input Multiple-Output (MIMO) transmission technology, and interference control technology.

In addition, taking into consideration the introduction of various devices as radio communication terminals in M2M (machine to machine) communication and the like as well as an increase in the number of multiplexing target terminals due to MIMO transmission technology, there is a concern regarding a shortage of resources in a mapping region for PDCCH (Physical Downlink Control Channel) that is used for a control signal (that is, a "PDCCH region"). If a control signal (PDCCH) cannot be mapped due to such a resource shortage, data cannot be assigned to the terminals. Therefore, even if a resource region in which data is to be mapped is available, the resource region may not be used, which causes a decrease in the system throughput.

As a method for solving such a resource shortage, a study is being carried out on assigning, also in a data region (that is, "PDSCH (Physical Downlink Shared CHannel" region), control signals for radio communication terminal apparatuses (hereunder, abbreviated as "terminals," UE (User Equipment)) served by a radio communication base station apparatus (hereunder, abbreviated as "base station"). A resource region in which control signals for terminals served by the base station are mapped is referred to as an Enhanced PDCCH (ePDCCH) region, a New-PDCCH (N-PDCCH) region, an X-PDCCH region or the like. Mapping the control signal (i.e., ePDCCH) in a data region as described above enables transmission power control on control signals transmitted to a terminal near a cell edge or interference control for interference by a control signal to another cell or interference from another cell to the cell provided by the base station.

Further, according to the LTE-Advanced system, in order to expand the coverage area of each base station, relay technology has been studied in which a radio communication relay station apparatus (hereunder, abbreviated as "relay station") is installed between a base station and terminals, and communication between the base station and terminals is performed via the relay station. The use of relay technology allows a terminal that cannot communicate with the base station directly to communicate with the base station via the relay station. According to the relay technology that has been introduced in the LTE-Advanced system, control signals for relay are assigned in a data region. Since it is expected that the control signals for relay may be extended for use as control signals for terminals, a resource region in which control signals for relay are mapped is also referred to as an "R-PDCCH."

In the LTE (Long Term Evolution) system, a DL grant (also referred to as "DL assignment"), which indicates a downlink (DL) data assignment, and a UL grant, which indicates an uplink (UL) data assignment are transmitted through a PDCCH.

In LTE-Advanced, a DL grant and a UL grant are mapped to R-PDCCH as well as PDCCH. In the R-PDCCH, the DL grant is mapped in the first slot and the UL grant is mapped in the second slot (refer to NPL 1). Thus, each relay station monitors (blind-decodes) control signals transmitted using an R-PDCCH from a base station within a resource region indicated by higher layer signaling from the base station (i.e., a "search space") and thereby finds the control signal intended for the corresponding relay station.

In this case, the base station indicates the search space corresponding to the R-PDCCH to the relay station by higher layer signaling as described above.

In the LTE and LTE-Advanced systems, one RB (resource block) has 12 subcarriers in the frequency domain and has a width of 0.5 msec in the time domain. A unit in which two RBs are combined in the time domain is referred to as an RB pair (for example, see FIG. 1). That is, an RB pair has 12 subcarriers in the frequency domain, and has a width of 1 msec in the time domain. When an RB pair represents a group of 12 subcarriers on the frequency axis, the RB pair may be referred to as simply "RB." In addition, in a physical layer, an RB pair is also referred to as a PRB pair (physical RB pair). A resource element (RE) is a unit defined by a single subcarrier and a single OFDM symbol (see FIG. 1).

PDCCH and R-PDCCH have four aggregation levels, i.e., levels 1, 2, 4, and 8 (for example, see NPL 1). Levels 1, 2, 4, and 8 have, for example, six, six, two, and two "mapping candidates," respectively. As used herein, the term "mapping candidate" refers to a candidate region in which a control signal is to be mapped, and a search space is formed by a plurality of mapping candidates. When a single aggregation level is configured for a single terminal, a control signal is actually mapped in one of the plurality of mapping candidates of the aggregation level. FIG. 2 illustrates an example of search spaces corresponding to an R-PDCCH. The ovals represent search spaces for the aggregation levels. The multiple mapping candidates in each search space for each aggregation level are located in a consecutive manner on VRBs (virtual resource blocks). The resource region candidates in the VRBs are mapped to PRBs (physical resource blocks) through higher layer signaling.

Studies are being conducted with respect to individually configuring search spaces corresponding to the ePDCCHs for terminals. Further, with respect to the design of the ePDCCHs, part of the design of the R-PDCCH described above can be used, and a design that is completely different from the R-PDCCH design can also be adopted. In fact, studies are also being conducted with regard to making the design of the ePDCCHs and the design of R-PDCCHs different from each other. In the following description, mapping candidates in a search space corresponding to ePDCCH may be called "ePDCCH candidates."

As described above, a DL grant is mapped to the first slot and a UL grant is mapped to the second slot in an R-PDCCH region. That is, a resource to which the DL grant is mapped and a resource to which the UL grant is mapped are divided on the time axis. In contrast, for the ePDCCHs, studies are being conducted with regard to dividing resources to which DL grants are mapped and UL grants are mapped on the frequency axis (that is, subcarriers or PRB pairs), and with regard to dividing REs within an RB pair into a plurality of groups.

In addition, "localized allocation" which allocates ePDCCHs collectively at positions close to each other on the frequency band, and "distributed allocation" which allocates the ePDCCHs by distributing ePDCCHs on the frequency band have been studied as allocation methods for ePDCCHs (for example, see FIG. 3). The localized allocation is an allocation method for obtaining a frequency scheduling gain, and can be used to allocate an ePDCCH to a resource that has favorable channel quality based on channel quality information. The distributed allocation distributes ePDCCHs on the frequency axis, and can obtain a frequency diversity gain. In the LTE-Advanced system, both a search space for localized allocation and a search space for distributed allocation may be configured (for example, see FIG. 3).

LTE-Advanced defines transmission methods such as transmission through single antenna port precoding and transmission through precoding using multiple antenna ports (e.g., see NPLs 2 and 3)

In the following description, transmission through single antenna port precoding may be called "single antenna port transmission ("One Tx port")" and transmission through precoding using multiple antenna ports may be called "transmission diversity using multiple antenna ports ("Multi ports Tx diversity" or simply "Tx diversity")." In the following description, the term "precoding" refers to assigning a weight to a transmission signal (multiplying a transmission signal by a weight) per antenna port or antenna. In addition, the term "layer" refers to s each of spatially multiplexed signals and may also be called "stream." Moreover, the term "rank" represents the number of layers. Furthermore, the term "transmission diversity" generically refers to transmission of data using a plurality of channels or a plurality of resources. By applying transmission diversity, signals are transmitted through channels (resources) including good channels (resources) and poor channels (resources), and it is thereby possible to obtain average receiving quality. That is, the transmission diversity makes receiving quality stable without causing it to degrade considerably. For example, channels or resources used in transmission diversity are frequency, time, space, antenna ports and beams.

[Single Antenna Port Transmission]

In single antenna port transmission, a base station selects precoding based on feedback information indicating channel quality measured by a terminal (also referred to as "closed-loop precoding" or "feedback-based precoding"). For this reason, single antenna port transmission is a transmission method which is effective when feedback information highly reliable, for example, when the moving speed of a terminal is relatively low. However, when feedback information cannot be obtained or when the terminal move relatively fast so that the feedback information is not very reliable, the base station may select optional precoding (open-loop processing).

For example, single antenna port transmission is applicable to antenna port 1 (CRS (Cell specific Reference Signal)), antenna port 4 (MBMS (Multimedia Broadcast Multicast Service)), antenna port 5 (UE specific RS), antenna port 7 (DMRS (Demodulation Reference Signal)) and antenna port 8 (DMRS).

[Transmission Diversity Using Multiple Antenna Ports]

Transmission diversity using multiple antenna ports can obtain a diversity gain without requiring feedback information. For this reason, transmission diversity using multiple antenna ports is a transmission method which is effective when the terminal moves relatively fast so that the channel quality varies drastically, or when channel quality is poor so that a diversity gain is necessary.

An example of transmission diversity using multiple antenna ports used at rank 2 or higher is large delay CDD (Cyclic Delay Diversity) (spatial multiplex+transmission diversity). On the other hand, transmission diversity using multiple antenna ports used at rank 1 is, for example, spatial frequency block coding for 2 antenna ports (SFBC: Space Frequency Block Code) and SFBC-FSTD (Frequency Switched Transmit Diversity) for 4 antenna ports.

For example, transmission diversity using multiple antenna ports is applied to antenna ports 1 and 2 (CRS) and antenna ports 1, 2, 3 and 4 (CRS). Note that transmission diversity using multiple antenna ports is supported in CRS, but not supported in DMRS.

CITATION LIST

Non-Patent Literature

NPL 1
3GPP TS 36.216 V10.1.0 "Physical layer for relaying operation"
NPL 2
3GPP TS 36.211 V10.4.0 "Physical Channels and Modulation"
NPL 3
3GPP TS 36.212 V10.4.0 "Multiplexing and channel coding"
NPL 4
InterDigital Communications, 3GPP RAN WG1 Meeting #68, R1-120138, "Reference Signals for ePDCCH," February 2012

BRIEF SUMMARY

Technical Problem

The number of CRS antenna ports used for demodulation of PDCCH is determined for each cell and is common to terminals within the same cell. The transmission method varies depending on the number of CRS antenna ports. More specifically, when the number of antenna ports is 1, precoding with the number of antenna ports of 1 (that is, single antenna port transmission) is applied, and when the number of antenna ports is 2 or 4, transmission diversity for 2 antenna ports or 4 antenna ports (that is, transmission diversity using multiple antenna ports) is applied.

When demodulating R-PDCCH, the base station indicates, to each terminal, which CRS or DMRS is to be used by higher layer signaling, and can thereby change a reference signal used for demodulation of R-PDCCH for each terminal. However, reference signals used for demodulation of R-PDCCH cannot be dynamically changed in subframe units. Therefore, in R-PDCCH, it is not possible to dynamically switch between transmission diversity using CRS and single antenna port transmission using DMRS.

In ePDCCH, studies are also being conducted on supporting both single antenna port transmission and transmission diversity using multiple antenna ports. Moreover, in ePDCCH, studies are being conducted on supporting transmission diversity using multiple antenna ports using DMRS without using CRS. Therefore, in ePDCCH, when switching between single antenna port transmission and transmission diversity using multiple antenna ports using DMRS, indication is necessary to indicate switching between transmission methods.

However, if the ePDCCH transmission method is switched by higher layer signaling, a control delay increases and it takes time to switch between the transmission methods. On the other hand, ePDCCH requires dynamically switching between transmission methods in, for example, CoMP (coordinated multiple point transmission and reception) operation control or interference control.

In response to the above-described demand, a method of increasing the number of times ePDCCH candidates are detected (number of times blind decoding is performed) and a method of increasing control signals indicating a transmission method are considered as the method for a terminal to select an appropriate ePDCCH transmission method.

The method of increasing the number of times ePDCCH candidates are detected is a method of performing blind decoding by assuming a plurality of transmission methods for the same ePDCCH candidate. However, when the number of times blind decoding is performed increases, an ePDCCH reception delay may occur and this delay may also affect reception processing on data that follows.

On the other hand, the method of increasing control signals indicating a transmission method is a method of indicating a transmission method for each ePDCCH candidate. For example, when the transmission method is switched between transmission diversity using 2 antenna ports and single antenna port transmission, one bit per ePDCCH candidate is necessary to indicate the transmission method. When a transmission method is indicated to each of all ePDCCH candidates (e.g., N ePDCCH candidates), N times the number of bits (e.g., 32 bits when N=32) are necessary.

In addition to the transmission method, by adding indication of various parameters necessary for blind decoding, optimum parameters can be configured for each of ePDCCH candidates. Examples of the above-described parameters are "DCI format" that determines a transmission mode, "aggregation level" that determines the number of REs forming each ePDCCH candidate, "antenna port number," ePDCCH arrangement method (localized or distributed) or the like in addition to the aforementioned transmission method as shown in FIG. 4 ("Tx diversity or not" in FIG. 4). However, as shown in FIG. 4, indication of these parameters requires a predetermined number of bits per ePDCCH candidate, and when these parameters are indicated for each ePDCCH candidate, N times the number of bits necessary for one ePDCCH candidate (number of ePDCCH candidate positions, N=32 in FIG. 4, for example) is necessary.

An object of the present invention is to provide a reception apparatus, a transmission apparatus, a reception method and a transmission method capable of switching between transmission methods while avoiding an increase in the number of times blind decoding is performed and the amount of signaling required for indication.

Solution to Problem

A reception apparatus according to an aspect of the present invention includes: a reception section that receives a signal mapped to one of a plurality of mapping candidates; and a processing section that performs blind decoding on the plurality of mapping candidates using one of a first transmission method and a second transmission method in accordance with an aggregation level configured for each of the plurality of mapping candidates, the first transmission method using a single antenna port to perform precoding based on feedback information from a reception apparatus and the second transmission method using multiple antenna ports to perform transmission diversity.

A transmission apparatus an aspect of the present invention includes: a precoding section that performs precoding on a signal mapped to one of a plurality of mapping candidates using one of a first transmission method and a second transmission method in accordance with an aggregation level configured for each of the plurality of mapping candidates, the first transmission method using a single antenna port to perform precoding based on feedback information from a reception apparatus and the second transmission method using multiple antenna ports to perform transmission diversity; and a transmission section that transmits the precoded signal.

A reception method an aspect of the present invention includes: receiving a signal mapped to one of a plurality of mapping candidates; and performing blind decoding on the plurality of mapping candidates using one of a first transmission method and a second transmission method in accordance with an aggregation level configured for each of the plurality of mapping candidates, the first transmission method using a single antenna port to perform precoding based on feedback information from a reception apparatus and the second transmission method using multiple antenna ports to perform transmission diversity.

A transmission method an aspect of the present invention includes: performing precoding on a signal mapped to one of a plurality of mapping candidates using one of a first transmission method and a second transmission method in accordance with an aggregation level configured for each of the plurality of mapping candidates, the first transmission method using a single antenna port to perform precoding based on feedback information from a reception apparatus and the second transmission method using multiple antenna ports to perform transmission diversity; and transmitting the precoded signal.

Advantageous Effects of Invention

According to the present invention, it is possible to switch between transmission methods while avoiding an increase in the number of times blind decoding is performed and the amount of signaling required for indication.

BRIEF DESCRIPTION OF THE SEVERAL VIEWS OF THE DRAWINGS

FIG. 4 illustrates the number of bits necessary to indicate each transmission parameter;

FIG. 5 is a block diagram illustrating main components of a configuration of a base station according to Embodiment 1 of the present invention;

FIG. 13 illustrates an example of mapping of antenna ports according to Embodiment 1 of the present invention;

FIG. 21 illustrates an example of mapping of antenna ports according to Embodiment 6 of the present invention.

DETAILED DESCRIPTION

Figure 1:
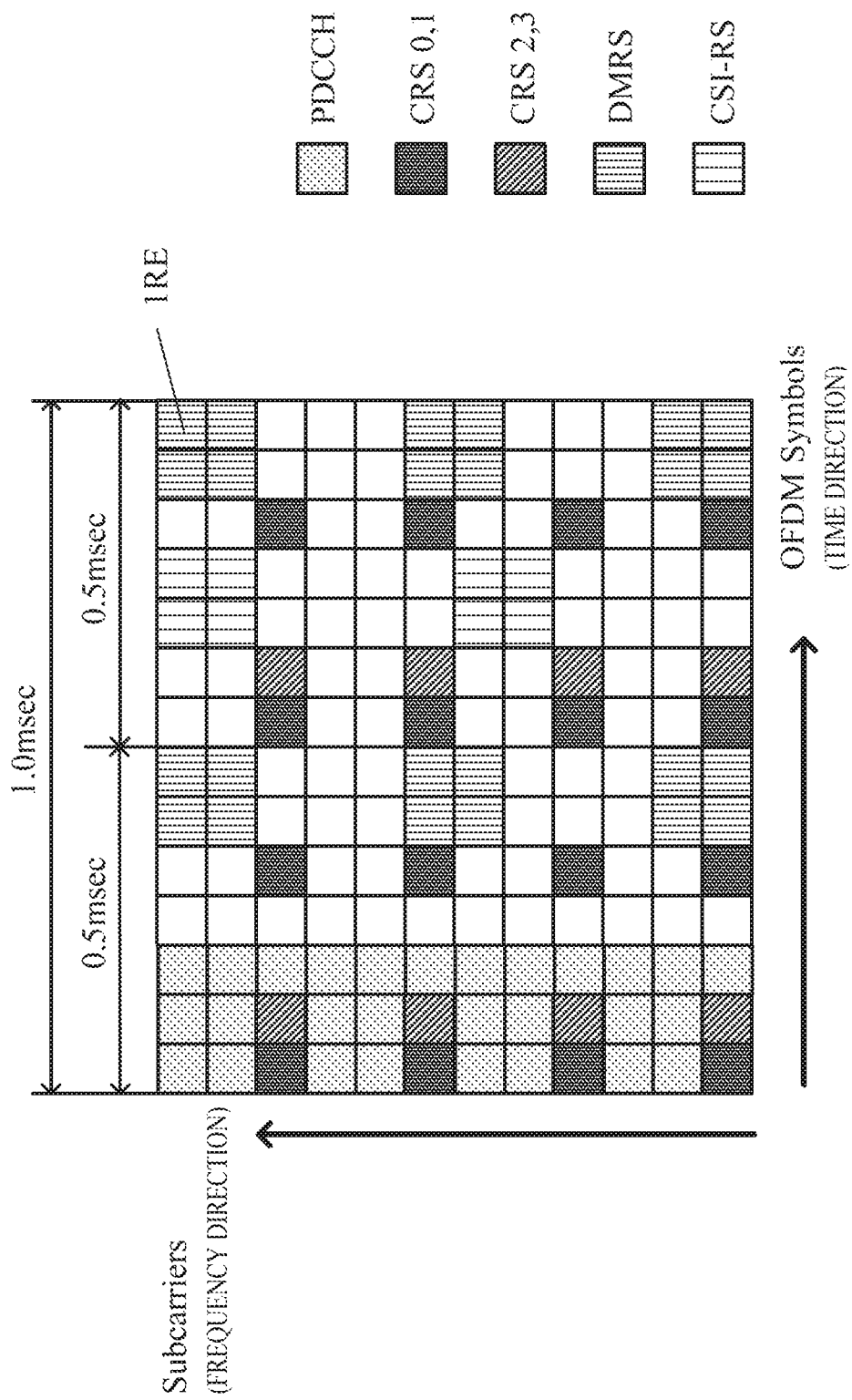
FIG. 1 is a diagram provided for describing a PRB pair.
Figure 2:
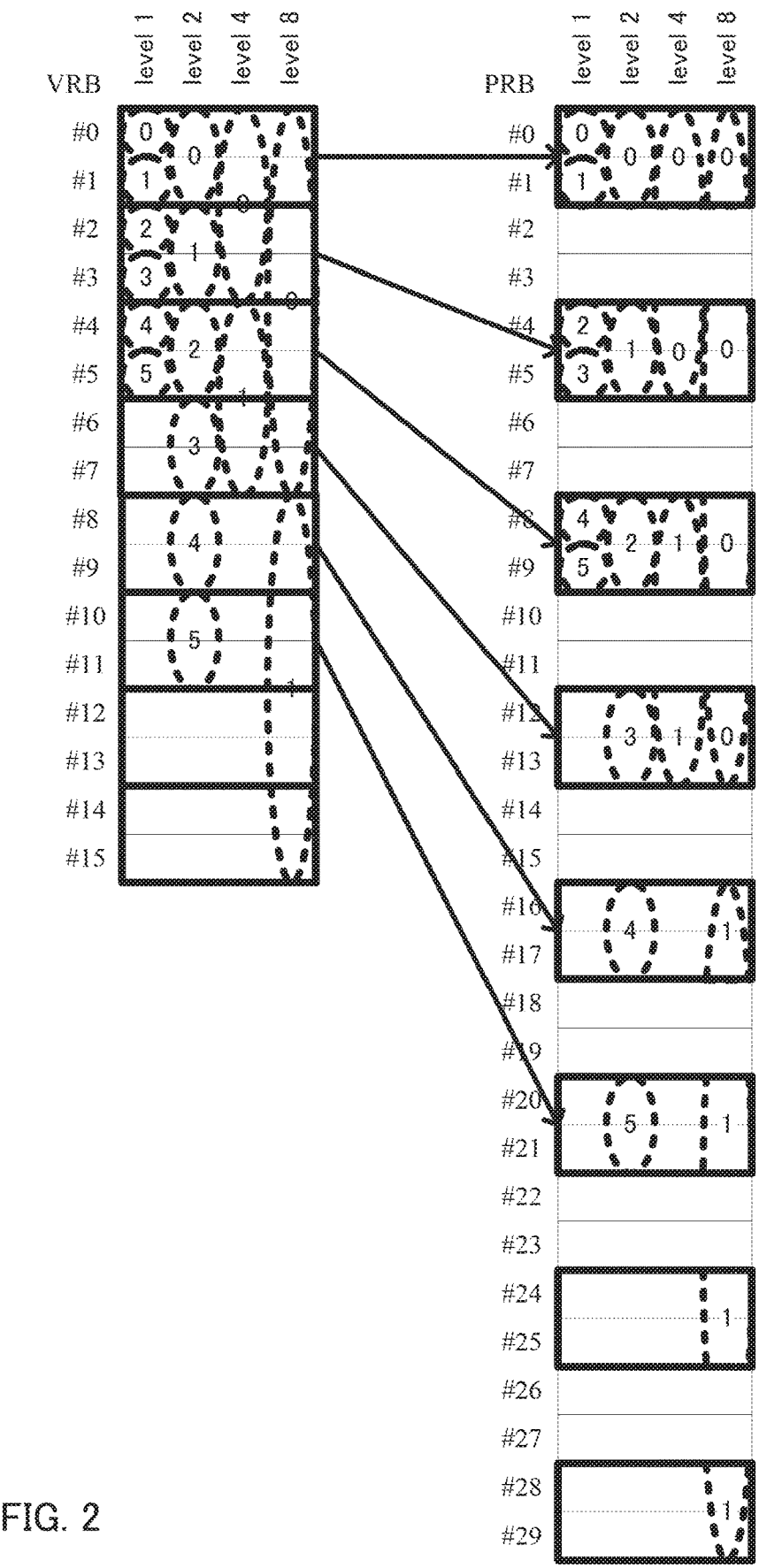
FIG. 2 illustrates an example of search spaces corresponding to R-PDCCHs.
Figure 3:
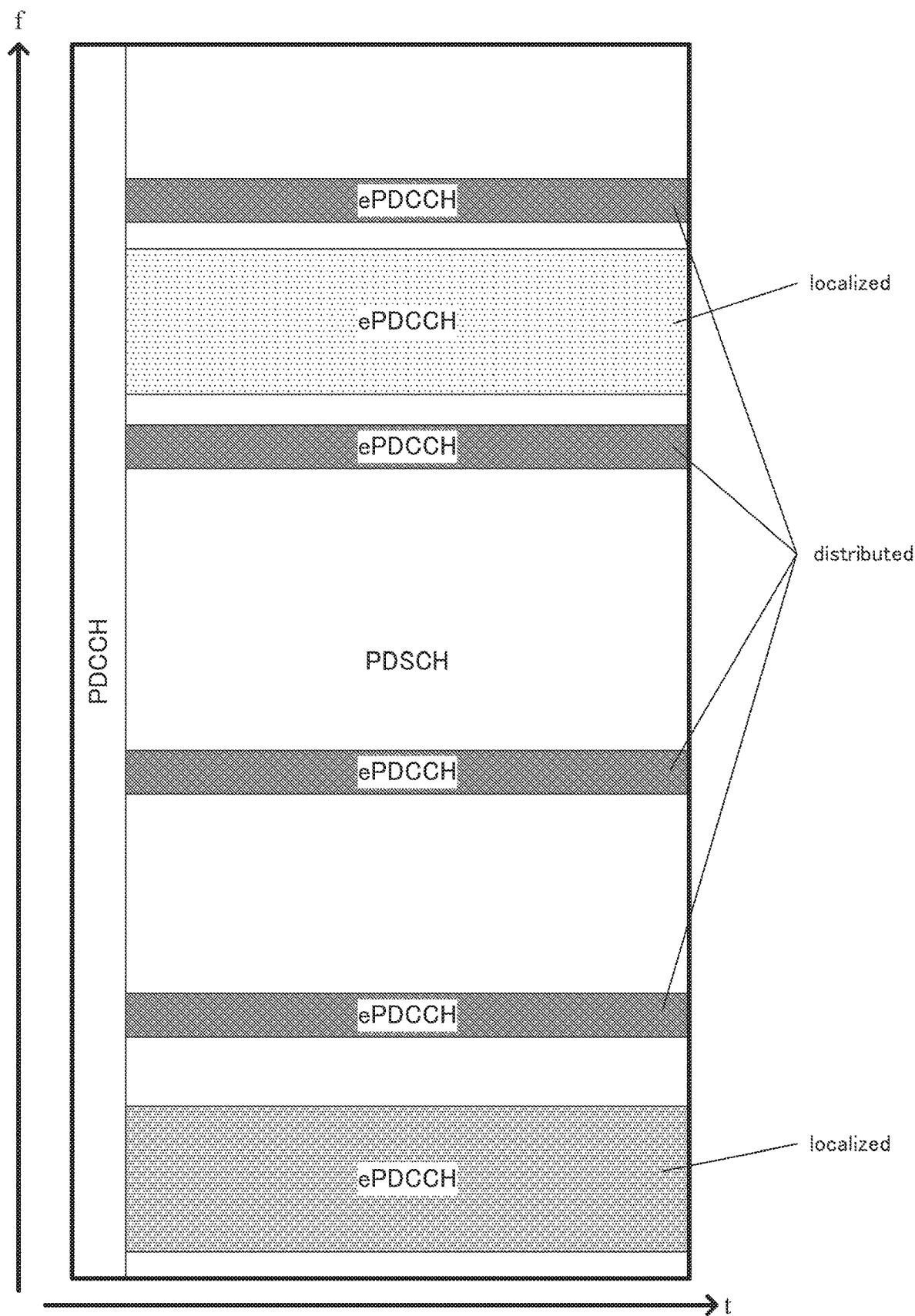
FIG. 3 illustrates an example of an ePDCCH allocation method.

Embodiments of the present invention will be described in detail hereunder with reference to the accompanying drawings. Throughout the embodiments, the same elements are assigned the same reference numerals, and any duplicate description of the elements is omitted.

Embodiment 1

[Communication System Overview]

A communication system according to the present embodiment includes a transmission apparatus and a reception apparatus. In particular, the present embodiment is described by taking base station 100 as the transmission apparatus and taking terminal 200 as the reception apparatus. The communication system is, for example, an LTE-Advanced system. Base station 100 is, for example, a base station that supports the LTE-Advanced system, and terminal 200 is, for example, a terminal that supports the LTE-Advanced system.

FIG. 5 is a block diagram illustrating main components of base station 100 according to the present embodiment.

In base station 100, precoding section 105 performs precoding on a signal mapped to one of a plurality of ePDCCH candidates using one of first transmission method (single antenna port transmission) using one of a first transmission method (single antenna port transmission) using single antenna port to perform precoding based on feedback information from terminal 200 and a second transmission method (transmission diversity using multiple antenna ports) that performs transmission diversity using multiple antenna ports in accordance with the aggregation level configured for each of a plurality of ePDCCH candidates (mapping candidates). Transmission section 107 transmits the precoded signals.

Figure 6:
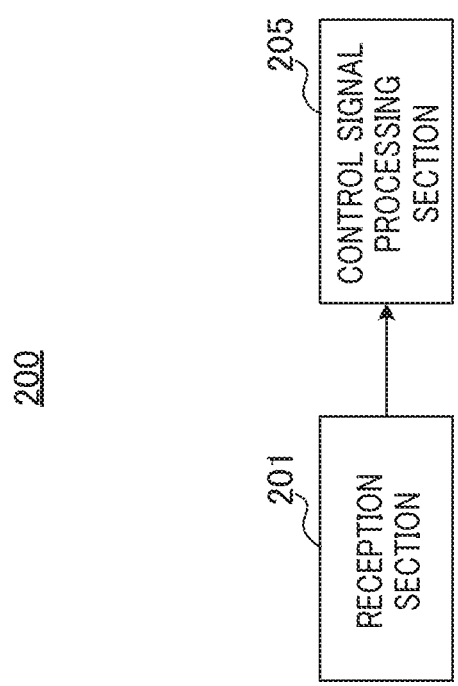
FIG. 6 is a block diagram illustrating main components of a terminal according to Embodiment 1 of the present invention.

FIG. 6 is a block diagram illustrating main components of terminal 200 according to the present embodiment.

In terminal 200, reception section 201 receives a signal mapped to one of the plurality of ePDCCH candidates (mapping candidates). Control signal processing section 205 performs blind decoding on the plurality of ePDCCH candidates using one of a first transmission method (single antenna port transmission) using single antenna port to perform precoding based on feedback information from terminal 200 and a second transmission method (transmission diversity using multiple antenna ports) that performs transmission diversity using multiple antenna ports in accordance with the aggregation level configured for each of a plurality of ePDCCH candidates (mapping candidates).

[Configuration of Base Station 100]

Figure 7:
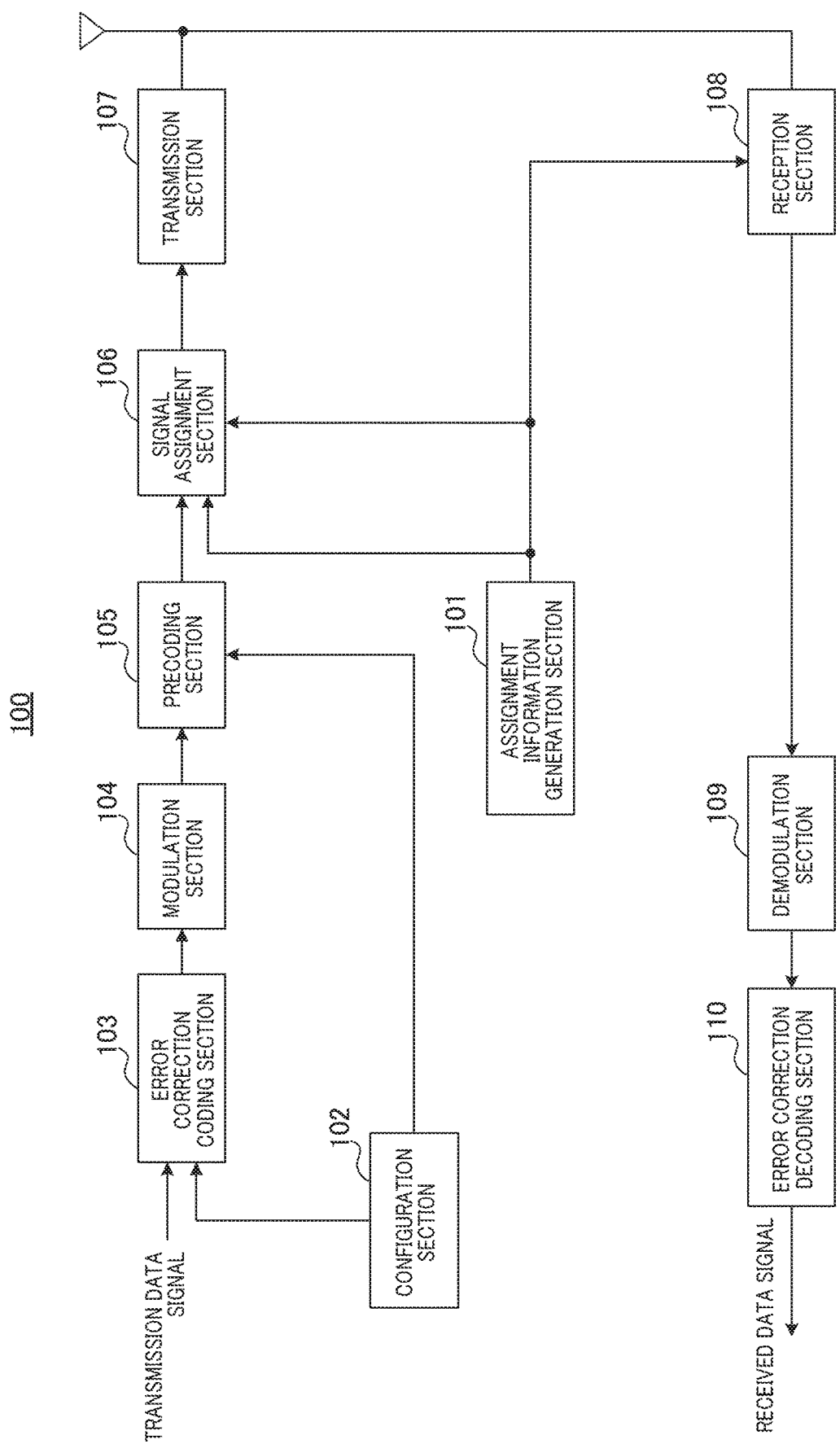
FIG. 7 is a block diagram illustrating a configuration of the base station according to Embodiment 1 of the present invention.

FIG. 7 is a block diagram illustrating a configuration of base station 100 according to the present embodiment. As illustrated in FIG. 7, base station 100 includes assignment information generation section 101, configuration section 102, error correction coding section 103, modulation section 104, precoding section 105, signal assignment section 106, transmission section 107, reception section 108, demodulation section 109, and error correction decoding section 110.

In a case where there is a downlink data signal (DL data signal) to be transmitted and an uplink data signal (UL data signal) to be assigned to an uplink (UL), assignment information generation section 101 determines resources (RB) to which the data signals are assigned, and generates assignment information (DL assignment and UL grant). The DL assignment includes information relating to assignment of the DL data signal. The UL grant includes information relating to allocated resources for the UL data signal to be transmitted from terminal 200. Assignment information generation section 101 determines a PDCCH candidate number (number assigned to a mapping candidate in PDCCH) to which the generated assignment information (DL assignment and UL grant) is assigned or an ePDCCH candidate number. The assignment information and PDCCH candidate number or ePDCCH candidate number are outputted to signal assignment section 106. The DL assignment is outputted to signal assignment section 106 as control information for assigning a DL data signal and the UL grant is outputted to reception section 108 as control information for receiving a UL data signal.

Configuration section 102 configures a method of transmitting control signals transmitted by ePDCCH or PDCCH. For example, configuration section 102 configures one of single antenna port transmission and transmission diversity using multiple antenna ports in accordance with an aggregation level configured for each of a plurality of ePDCCH candidates for ePDCCH. The configured "information relating to transmission method" is outputted to precoding section 105 and also outputted to error correction coding section 103 as a control signal.

Error correction coding section 103 receives a transmission data signal (DL data signal) and control information received from configuration section 102 as input signals, performs error correction coding on the input signals, and outputs the processed signals to modulation section 104.

Modulation section 104 modulates the signals received from error correction coding section 103, and outputs the modulated data signal to precoding section 105.

Precoding section 105 performs precoding processing on the control signals transmitted by ePDCCH or PDCCH. More specifically, for control signals, precoding section 105 determines precoding to be used based on the transmission method (single antenna port transmission or transmission diversity using multiple antenna ports) indicated from configuration section 102 and the ePDCCH candidate number or PDCCH candidate number indicated from assignment information generation section 101. Precoding section 105 then multiplies the control signals by the determined precoding for each antenna port and outputs the precoded control signals to signal assignment section 106. Precoding section 105 also multiplies data signals by precoding defined for each and outputs the precoded data signals to signal assignment section 106.

Signal assignment section 106 assigns the assignment information (DL assignment and UL grant) received from assignment information generation section 101 to ePDCCH or PDCCH. Signal assignment section 106 assigns the data signals received from precoding section 105 to downlink resources corresponding to the assignment information (DL assignment) received from assignment information generation section 101.

A transmission signal is formed by assignment information and a data signal being assigned to predetermined resources in this manner. The thus-formed transmission signal is outputted to transmission section 107.

Transmission section 107 executes radio transmission processing such as up-conversion on the input signal, and transmits the obtained signal to terminal 200 via an antenna.

Reception section 108 receives a signal transmitted from terminal 200 via an antenna, and outputs the received signal to demodulation section 109. More specifically, reception section 108 separates a signal that corresponds to a resource indicated by a UL grant received from assignment information generation section 101 from the received signal, and executes reception processing such as down-conversion on the separated signal and thereafter outputs the obtained signal to demodulation section 109.

Demodulation section 109 executes demodulation processing on the input signal, and outputs the obtained signal to error correction decoding section 110.

Error correction decoding section 110 decodes the input signal to obtain the received data signal from terminal 200.

[Configuration of Terminal 200]

Figure 8:
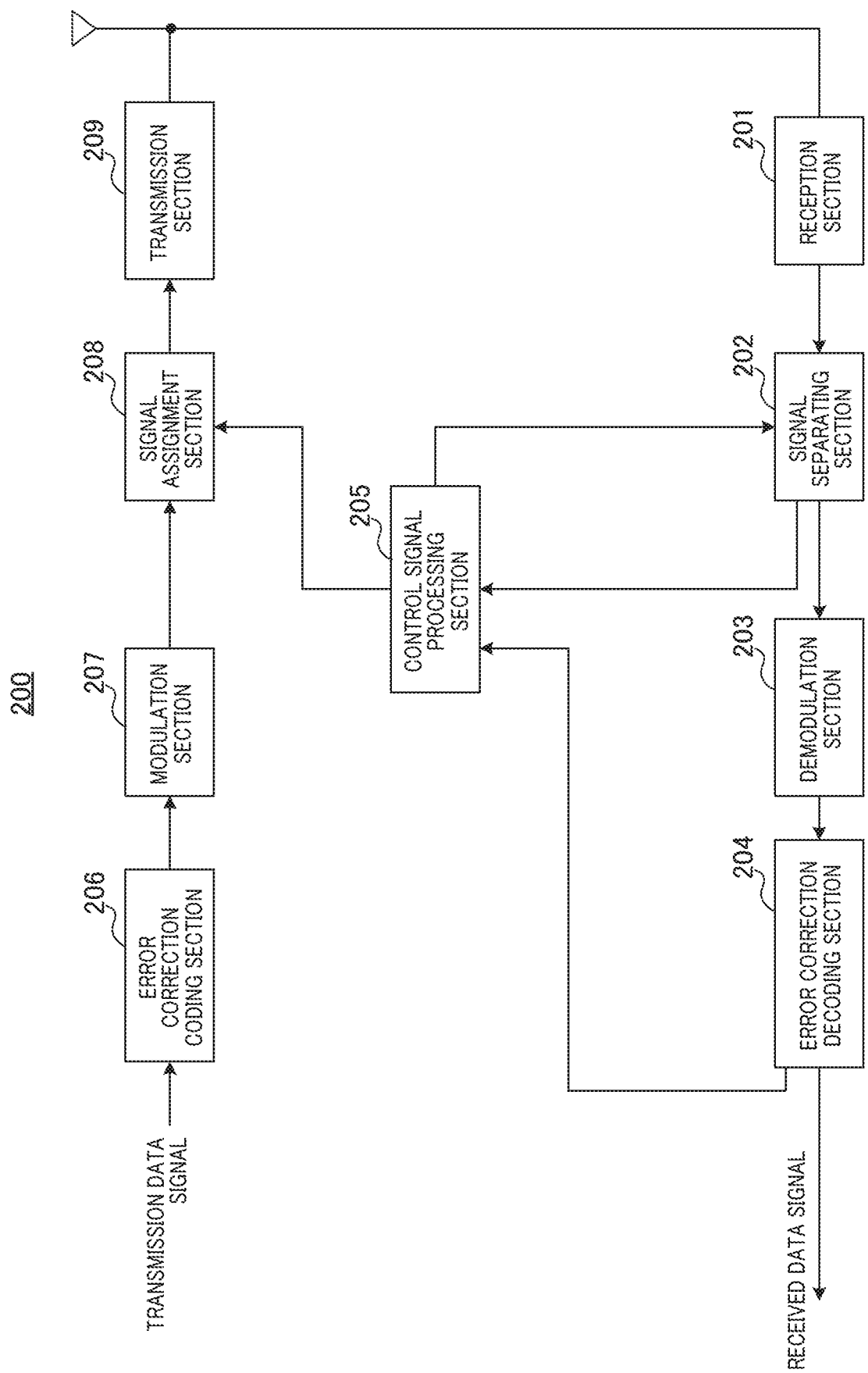
FIG. 8 is a block diagram illustrating a configuration of the terminal according to Embodiment 1 of the present invention.

FIG. 8 is a block diagram illustrating the configuration of terminal 200 according to the present embodiment. As illustrated in FIG. 8, terminal 200 includes reception section 201, signal separating section 202, demodulation section 203, error correction decoding section 204, control signal processing section 205, error correction coding section 206, modulation section 207, signal assignment section 208, and transmission section 209.

Reception section 201 receives a signal transmitted from base station 100 via an antenna, and after executing reception processing such as down-conversion on the received signal, outputs the processed signal to signal separating section 202. Received signals include, for example, control signals mapped to one of a plurality of ePDCCH candidates constituting search spaces in ePDCCH.

Signal separating section 202 extracts a control signal relating to resource allocation from the reception signal received from reception section 201, and outputs the extracted signal to control signal processing section 205. Signal separating section 202 also extracts from the reception signal a signal corresponding to a data resource (that is, a DL data signal and control signal) indicated by the DL assignment outputted from control signal processing section 205, and outputs the extracted signal to demodulation section 203.

Demodulation section 203 demodulates the signal outputted from signal separating section 202, and outputs the demodulated signal to error correction decoding section 204.

Error correction decoding section 204 decodes the demodulated signal outputted from demodulation section 203, and outputs the obtained received data signal. In particular, error correction decoding section 204 outputs "information relating to transmission method" transmitted as a control signal from base station 100, to control signal processing section 205.

Control signal processing section 205 identifies a transmission method (precoding) configured for each PDCCH candidate or ePDCCH candidate based on the "information relating to transmission method" indicated in the information received from error correcting decoding section 204 in the signal component received from signal separating section 202. Control signal processing section 205 performs blind decoding on each PDCCH candidate or each ePDCCH candidate using the identified transmission method, and thereby detects a control signal (DL assignment or UL grant) for terminal 200. For example, control signal processing section 205 performs blind decoding on a plurality of ePDCCH candidates using one of single antenna port transmission and transmission diversity using multiple antenna ports in accordance with the aggregation level configured for each of the plurality of ePDCCH candidates constituting search spaces in ePDCCH, and thereby obtains a control signal intended for terminal 200. Control signal processing section 205 outputs a detected DL assignment intended for terminal 200 to signal separating section 202, and outputs a detected UL grant intended for terminal 200 to signal assignment section 208.

When a transmission data signal (UL data signal) is inputted to error correction coding section 206, error correction coding section 206 performs error correction coding on the transmission data signal and outputs the obtained signal to modulation section 207.

Modulation section 207 modulates the signal outputted from error correction coding section 206, and outputs the modulated signal to signal assignment section 208.

Signal assignment section 208 assigns the signal outputted from modulation section 207 according to the UL grant received from control signal processing section 205, and outputs the obtained signal to transmission section 209.

Transmission section 209 executes transmission processing such as up-conversion on the input signal, and transmits the obtained signal.

[Operation of Base Station 100 and Terminal 200]

The operation of base station 100 and terminal 200 each configured in the manner described above will be described.

The present embodiment uses an aggregation level as a reference for switching between single antenna port transmission (One Tx port) and transmission diversity using multiple antenna ports (Tx diversity).

More specifically, in the present embodiment, base station 100 performs precoding using single antenna port transmission for ePDCCH candidates corresponding to a low aggregation level and performs precoding using transmission diversity using multiple antenna ports for ePDCCH candidates corresponding to a high aggregation level. On the other hand, terminal 200 receives (blind-decodes) a signal for ePDCCH candidates corresponding to a low aggregation level assuming single antenna port transmission and receives (blind-decodes) a signal for ePDCCH candidates corresponding to a high aggregation level assuming transmission diversity using multiple antenna ports.

Thus, the lower the aggregation level configured for a plurality of ePDCCH candidates constituting search spaces in ePDCCH, the greater is the number of mapping candidates blind-decoded using single antenna port transmission, and the higher the configured aggregation level, the greater is the number of mapping candidates blind-decoded using transmission diversity using multiple antenna ports.

On the other hand, in this case, there is a limitation that it is hard to use a combination of a low aggregation level and transmission diversity using multiple antenna ports and a combination of a high aggregation level and single antenna port transmission.

However, low aggregation levels (e.g., levels 1 and 2 are assumed to be used in cases where reliability of feedback information from terminal 200 to base station 100 is relatively high such as when channel quality is good or when the moving speed of terminal 200 is relatively slow. For this reason, for low aggregation levels, single antenna port transmission is effective in which precoding is selected based on feedback information.

On the other hand, high aggregation levels (e.g., levels 4 and 8) are assumed to be used in cases where reliability of feedback information from terminal 200 to base station 100 is relatively low such as when channel quality is poor or when the moving speed of terminal 200 is relatively high. For this reason, for high aggregation levels, transmission diversity using multiple antenna ports is effective to obtain a diversity gain.

From above, even if the aforementioned limitation is generated regarding a combination of a transmission method and an aggregation level, the influence on ePDCCH reception characteristics is small.

Hereinafter, operation example 1-1 to operation example 1-3 of base station 100 and terminal 200 according to the present embodiment will be described.

The following description assumes, as an example, that the numbers of ePDCCH candidates (that is, the numbers of blind decoding targets) are 12, 12, 4 and 4 for aggregation levels 1, 2, 4 and 8 respectively.

During single antenna port transmission, an antenna port is used which is indicated beforehand from base station 100 to terminal 200 using a higher layer control signal. On the other hand, during transmission diversity using multiple antenna ports, a transmission diversity method (e.g., transmission diversity using 2 antenna ports) and antenna ports to be used are configured beforehand.

Operation Example 1-1

In operation example 1-1, base station 100 and terminal 200 apply single antenna port transmission as the transmission method for ePDCCH candidates at a low aggregation level and applies transmission diversity using 2 antenna ports as the transmission method for ePDCCH candidates at a high aggregation level.

For example, in base station 100, configuration section 102 configures single antenna port transmission as the transmission method for ePDCCH candidates at aggregation levels 1 and 2. On the other hand, configuration section 102 configures transmission diversity using 2 antenna ports as the transmission method for ePDCCH candidates at aggregation levels 4 and 8.

Figure 9:
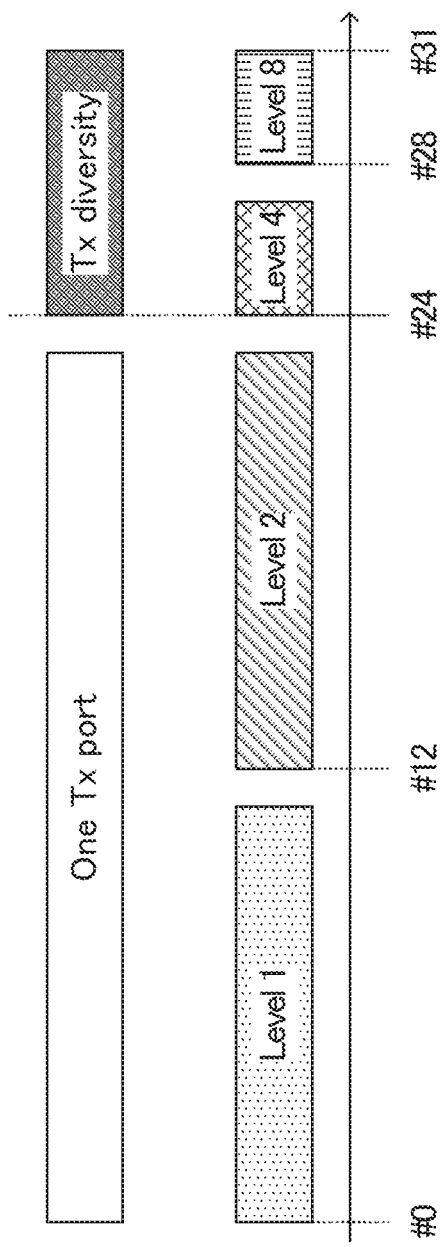
FIG. 9 illustrates an example of switching between transmission methods according to Embodiment 1 of the present invention (operation example 1-1)

Thus, precoding section 105 performs precoding processing on ePDCCH candidates (ePDCCH candidate numbers: #0 to #23) corresponding to aggregation levels 1 and 2 as shown in FIG. 9 using single antenna port transmission. On the other hand, precoding section 105 performs precoding processing on ePDCCH candidates (ePDCCH candidate numbers: #24 to #31) corresponding to aggregation levels 4 and 8 using transmission diversity using 2 antenna ports.

On the other hand, in terminal 200, control signal processing section 205 performs blind decoding on ePDCCH candidates (ePDCCH candidate numbers: #0 to #23) corresponding to aggregation levels 1 and 2 using single antenna port transmission as shown in FIG. 9. On the other hand, control signal processing section 205 performs blind decoding on ePDCCH candidates (ePDCCH candidate numbers: #24 to #31) corresponding to aggregation levels 4 and 8 using transmission diversity using 2 antenna ports.

Thus, since terminal 200 can identify a transmission method in accordance with aggregation levels, signaling for switching between transmission method is no longer necessary. For example, compared to the case where the transmission method is indicated for each ePDCCH candidate as shown in FIG. 4, it is possible to reduce the number of bits necessary for indicating switching between transmission methods (Tx diversity or not) from N bits (32 bits in FIG. 4) to 0 bits.

In operation example 1-1, it is possible to switch between transmission methods for each ePDCCH candidate corresponding to each aggregation level at a boundary between specific aggregation levels (between aggregation levels 2 and 4 in FIG. 9). Thus, compared to the case where only one transmission method can be configured by signaling of a higher layer such as R-PDCCH, dynamic switching between transmission methods is possible in ePDCCH.

A case has been described in FIG. 9 where the transmission method is switched between aggregation levels 1 and 2 (less than predetermined value 4) and aggregation levels 4 and 8 (equal to or above predetermined value 4), but the present invention is not limited to this. For example, signaling indicating a boundary between which aggregation levels should be used as a reference for switching between the transmission methods may be transmitted from base station 100 to terminal 200. For example, in the case of "00," single antenna port transmission may be used at aggregation levels 1 and 2, and transmission diversity using multiple antenna ports may be used at aggregation levels 4 and 8, in the case of "01," single antenna port transmission may be used at aggregation levels 1, 2 and 4 and transmission diversity using multiple antenna ports may be used at aggregation level 8, in the case of "10," single antenna port transmission may be used at aggregation levels 1, 2, 4 and 8 (that is, all levels), and in the case of "11," transmission diversity using multiple antenna ports may be used at aggregation levels 1, 2, 4 and 8 (that is, all levels). The amount of signaling necessary for switching between the transmission methods is no more than 2 bits in this case too. That is, it is also possible to reduce the number of bits necessary for switching between the transmission methods in this case compared to the method of indicating the transmission method shown in FIG. 4.

Alternatively, in addition to the above-described four patterns, a pattern in which single antenna port transmission is used at aggregation level 1 and transmission diversity using multiple antenna ports is used at aggregation levels 2, 4 and 8, may be added, and one of a total of five patterns may be indicated (that is, indicated with 3 bits) from base station 100 to terminal 200 or one of four patterns obtained by excluding one from the above-described five patterns may be indicated (that is, indicated with 2 bits) from base station 100 to terminal 200.

Thus, operation using single antenna port transmission for all ePDCCH candidates and operation using transmission diversity using multiple antenna ports for all ePDCCH candidates are also possible. Therefore, all ePDCCH candidates can be used effectively even when there is terminal 200 or base station 100 that supports only one transmission method (reception method).

Operation Example 1-2

In operation example 1-2, ePDCCH candidate numbers are assigned, for example, in ascending order from ePDCCH candidates corresponding to low aggregation levels to ePDCCH candidates corresponding to high aggregation levels.

Figure 10:
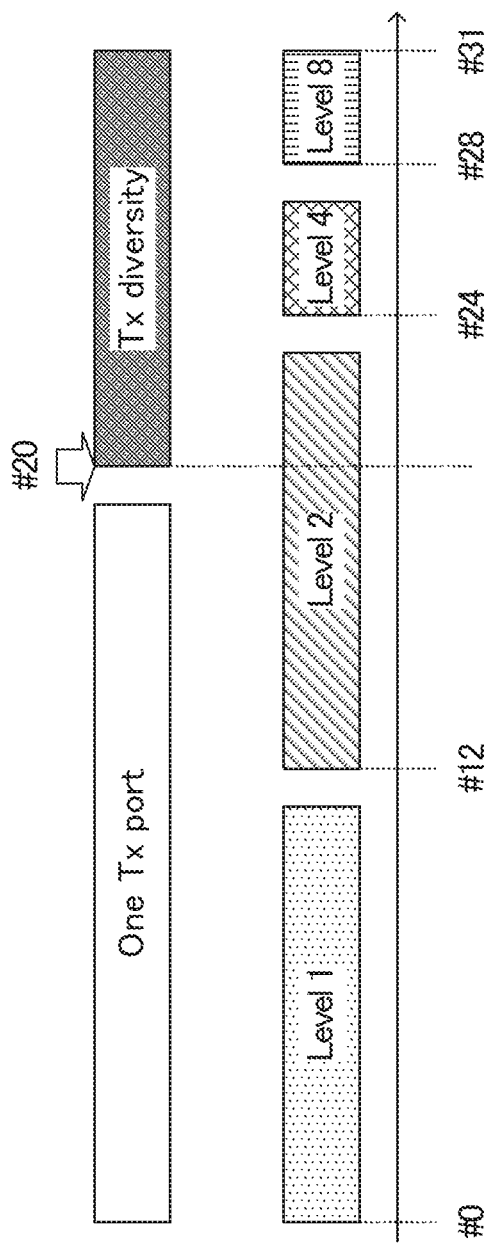
FIG. 10 illustrates an example of switching between transmission methods according to Embodiment 1 of the present invention (operation example 1-2)

For example, as shown in FIG. 10, for 32 ePDCCH candidates, ePDCCH candidate numbers #0 to #31 are assigned in ascending order from ePDCCH candidates corresponding to lower aggregation levels. More specifically, as shown in FIG. 10, ePDCCH candidates with ePDCCH candidate numbers #0 to #11 correspond to aggregation level 1, ePDCCH candidates with ePDCCH candidate numbers #12 to #23 correspond to aggregation level 2, ePDCCH candidates with ePDCCH candidate numbers #24 to #27 correspond to aggregation level 4 and ePDCCH candidates with ePDCCH candidate numbers #28 to #31 correspond to aggregation level 8.

In base station 100, configuration section 102 configures a specific ePDCCH candidate number for switching between transmission methods (reference for switching between ePDCCH transmission methods) for each terminal 200. For example, in FIG. 10, configuration section 102 configures ePDCCH candidate number #20 corresponding to aggregation level 2 as a reference for switching between ePDCCH transmission methods. Configured ePDCCH candidate number #20 (information relating to switching between ePDCCH transmission methods) is outputted to precoding section 105. Configured ePDCCH candidate number #20 is also indicated to terminal 200 as a control signal. For example, higher layer signaling is used for this indication.

As shown in FIG. 10, precoding section 105 performs precoding processing on ePDCCH candidates (#0 to #19) assigned ePDCCH candidate numbers lower than #20 using single antenna port transmission. On the other hand, as shown in FIG. 10, precoding section 105 performs precoding processing on ePDCCH candidates (#20 to #31) assigned ePDCCH candidate numbers equal to or greater than #20 using transmission diversity using multiple antenna ports.

On the other hand, in terminal 200, reception section 201 receives ePDCCH candidate number #20 as information relating to switching between ePDCCH transmission methods from base station 100. Thus, as shown in FIG. 10, control signal processing section 205 performs blind decoding on ePDCCH candidates (#0 to #19) assigned ePDCCH candidate numbers lower than #20 using single antenna port transmission. On the other hand, as shown in FIG. 10, control signal processing section 205 performs blind decoding on ePDCCH candidates (#20 to #31) assigned ePDCCH candidate numbers equal to or greater than #20 using transmission diversity using multiple antenna ports.

When the total number of ePDCCH candidates is assumed to be N, the number of bits necessary for indicating an ePDCCH candidate which becomes the above-described reference for switching between transmission methods becomes ceil ($\log_2(N+1)$) bits. Function ceil (x) is a function that returns a minimum integer equal to or greater than x.

For example, in FIG. 10, since N=32, ceil ($\log_2(N+1)$)=6 bits.

Note that, when #N (#32 in FIG. 10) is indicated from base station 100 to terminal 200, single antenna port transmission may be adopted as the transmission method for all ePDCCH candidates, whereas when #0 is indicated, transmission diversity using multiple antenna ports may be adopted as the transmission method for all ePDCCH candidates.

Assuming a range for indicating an ePDCCH candidate which becomes the above-described reference for switching between transmission methods is #0 to #N−1, when #N−1 (#31 in FIG. 10) is indicated from base station 100 to terminal 200, single antenna port transmission may be adopted as the transmission method for all ePDCCH candidates. In this case, the number of bits necessary to indicate an ePDCCH candidate which becomes the above-described reference for switching between transmission methods becomes ceil ($\log_2(N)$) bits. For example, in FIG. 10, since N=32, ceil ($\log_2(N)$)=5 bits, which is one bit fewer than ceil ($\log_2(N+1)$).

Thus, by receiving an indication of an ePDCCH candidate number which becomes a reference for switching between transmission methods from base station 100, terminal 200 can identify the transmission method. Thus, compared to the case as shown, for example, in FIG. 4 where a transmission method is indicated for each ePDCCH candidate, it is possible to reduce the number of bits necessary to indicate switching between transmission methods (Tx diversity or not) from N bits (32 bits in FIG. 4) to ceil ($\log_2(N+1)$) bits or ceil ($\log_2(N)$) bits (6 bits or 5 bits).

In operation example 1-2, operation adopting single antenna port transmission for all ePDCCH candidates and operation adopting transmission diversity using multiple antenna ports for all ePDCCH candidates are also possible. Thus, even when terminal 200 or base station 100 that supports only one transmission method (reception method) exists, it is possible to effectively use all ePDCCH candidates.

In operation example 1-2, it is possible to switch between transmission methods for each ePDCCH candidate corresponding to each aggregation level using an ePDCCH candidate number which becomes a reference for switching between transmission methods as a boundary. This enables dynamic switching between transmission methods in ePDCCH compared to the case where only one transmission method can be configured through signaling of a higher layer such as R-PDCCH.

In operation example 1-2, of ePDCCH candidates (#12 to #23) corresponding to aggregation level 2 shown, for example, in FIG. 10, single antenna port transmission is configured for some ePDCCH candidates (#12 to #19) and transmission diversity using multiple antenna ports is configured for the remaining ePDCCH candidates (#20 to #23). That is, in operation example 1-1, switching between transmission methods in units of aggregation levels is possible, whereas in operation example 1-2, switching between transmission methods in units of ePDCCH candidates is further possible at specific aggregation levels. Thus, in operation example 1-2 compared to operation example 1-1, it is possible to more flexibly assign control signals to terminal 200.

Operation Example 1-3

In operation example 1-3, ePDCCH candidate numbers are assigned in ascending order from ePDCCH candidates corresponding to aggregation levels lower than L to ePDCCH candidates corresponding to aggregation levels equal to or higher than L. L is any given natural number. The aggregation levels lower than L and aggregation levels equal to or higher than L may include a plurality of aggregation levels.

Figure 11:
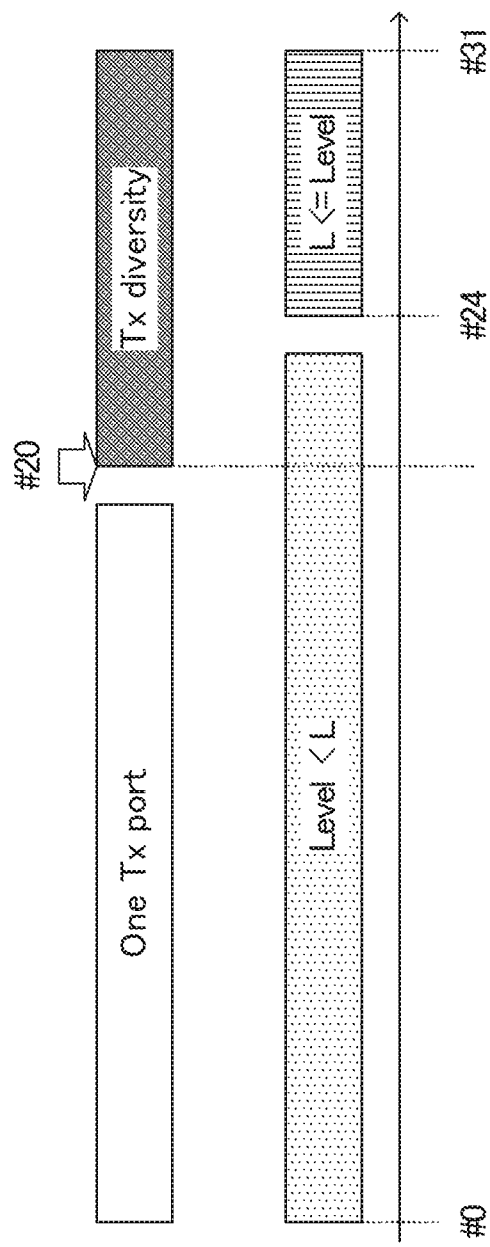
FIG. 11 illustrates an example of switching between transmission methods according to Embodiment 1 of the present invention (operation example 1-3)

For example, as shown in FIG. 11, for 32 ePDCCH candidates, ePDCCH candidate numbers #0 to #31 are assigned in ascending order from ePDCCH candidates corresponding to aggregation levels lower than L. More specifically, as shown in FIG. 11, ePDCCH candidates with ePDCCH candidate numbers #0 to #23 correspond to aggregation levels lower than L (Level<L) and ePDCCH candidates with ePDCCH candidate numbers #24 to #31 correspond to aggregation levels equal to or higher than L (Level≥L).

In base station 100, configuration section 102 configures a specific ePDCCH candidate number for switching between transmission methods (reference for switching between transmission methods of ePDCCH) for each terminal 200.

For example, as shown in FIG. 11, a case will be described where configuration section 102 configures ePDCCH candidate number #20 corresponding to an aggregation level lower than L as a reference for switching between transmission methods of ePDCCH. Configured ePDCCH candidate number #20 (information relating to switching between transmission methods of ePDCCH) is outputted to precoding section 105. Moreover, configured ePDCCH candidate number #20 is indicated to terminal 200 as a control signal.

For this indication, for example, signaling of a higher layer is used.

As shown in FIG. 11, precoding section 105 performs precoding processing on ePDCCH candidates (#0 to #19) assigned ePDCCH candidate numbers lower than #20 using single antenna port transmission. On the other hand, as shown in FIG. 11, precoding section 105 performs precoding processing on ePDCCH candidates (#20 to #31) assigned ePDCCH candidate numbers equal to or greater than #20 using transmission diversity using multiple antenna ports.

On the other hand, in terminal 200, reception section 201 receives ePDCCH candidate number #20 as information relating to switching between transmission methods of ePDCCH from base station 100. Thus, control signal processing section 205 performs blind decoding on ePDCCH candidates (#0 to #19) assigned ePDCCH candidate numbers lower than #20 as shown in FIG. 11 using single antenna port transmission. On the other hand, control signal processing section 205 performs blind decoding on ePDCCH candidates (#20 to #31) assigned ePDCCH candidate numbers equal to or greater than #20 as shown in FIG. 11 using transmission diversity using multiple antenna ports.

Figure 12:
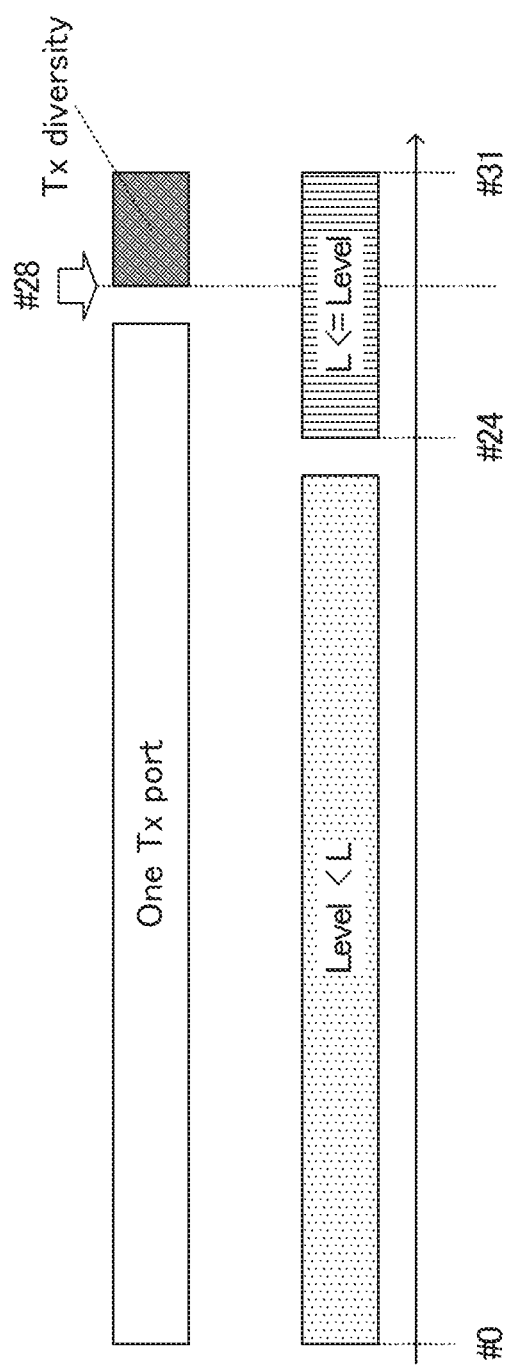
FIG. 12 illustrates an example of switching between transmission methods according to Embodiment 1 of the present invention (operation example 1-3)

Next, as shown in FIG. 12, a case will be described where configuration section 102 configures ePDCCH candidate number #28 corresponding to an aggregation level equal to or greater than L as a reference for switching between transmission methods of ePDCCH. Configured ePDCCH candidate number #28 (information relating to switching between transmission methods of ePDCCH) is outputted to precoding section 105 and indicated to terminal 200 as a control signal.

As shown in FIG. 12, precoding section 105 performs precoding processing on ePDCCH candidates (#0 to #27) assigned ePDCCH candidate numbers lower than #28 using single antenna port transmission. On the other hand, precoding section 105 performs precoding processing on ePDCCH candidates (#28 to #31) assigned ePDCCH candidate numbers equal to or greater than #28 as shown in FIG. 12 using transmission diversity using multiple antenna ports.

On the other hand, in terminal 200, reception section 201 receives ePDCCH candidate number #28 as information relating to switching between transmission methods of ePDCCH from base station 100. Thus, as shown in FIG. 12, control signal processing section 205 performs blind decoding on ePDCCH candidates (#0 to #27) assigned ePDCCH candidate numbers lower than #28 using single antenna port transmission. On the other hand, as shown in FIG. 12, control signal processing section 205 performs blind decoding on ePDCCH candidates (#28 to #31) assigned ePDCCH candidate numbers equal to or greater than #28 using transmission diversity using multiple antenna ports.

Here, when the total number of ePDCCH candidates is assumed to be N, the number of bits necessary to indicate an ePDCCH candidate which becomes the above-described reference for switching between transmission methods can be ceil ($\log_2(N+1)$) bits or ceil ($\log_2(N)$) bits as in the case of operation example 1-2.

In operation example 1-3, it is possible to flexibly switch between transmission methods for each ePDCCH candidate using the ePDCCH candidate number which becomes the reference for switching between transmission methods as a boundary. This enables dynamic switching between transmission methods in ePDCCH compared to the case where only one transmission method can be configured by higher layer signaling as in the case of R-PDCCH.

In operation example 1-3, among ePDCCH candidates (#0 to #23) corresponding to aggregation levels lower than L shown, for example, in FIG. 11, single antenna port transmission is configured for some ePDCCH candidates (#0 to #19) and transmission diversity using multiple antenna ports is configured for the remaining ePDCCH candidates (#20 to #23). That is, when a plurality of aggregation levels are included in aggregation levels lower than L, both single antenna port transmission and transmission diversity using multiple antenna ports can also be configured at a plurality of aggregation levels.

In operation example 1-3, among ePDCCH candidates (#24 to #31) corresponding to aggregation levels higher than L shown in, for example, FIG. 12, single antenna port transmission is configured for some ePDCCH candidates (#24 to #27) and transmission diversity using multiple antenna ports is configured for the remaining ePDCCH candidates (#28 to #31). That is, when a plurality of aggregation levels are included in aggregation levels equal to or higher than L, both single antenna port transmission and transmission diversity using multiple antenna ports can also be configured at a plurality of aggregation levels.

Here, a case has been described where ePDCCH candidates are divided into ePDCCH candidates corresponding to aggregation levels lower than L and ePDCCH candidates corresponding to aggregation levels equal to or higher than L, but ePDCCH candidates may also be divided into ePDCCH candidates corresponding to aggregation levels equal to or lower than L and ePDCCH candidates corresponding to aggregation levels higher than L.

Operation example 1-1 to operation example 1-3 of base station 100 and terminal 200 according to the present embodiment have been described so far.

Thus, in the present embodiment, base station 100 and terminal 200 use single antenna port transmission for ePDCCH candidates corresponding to low aggregation levels and use transmission diversity using multiple antenna ports for ePDCCH candidates corresponding to high aggregation levels. This allows terminal 200 to identify a transmission method in accordance with an aggregation level configured in each ePDCCH candidate. That is, the amount of signaling required to indicate a transmission method can be reduced compared to the case where a transmission method is indicated for each ePDCCH candidate.

Regarding a plurality of ePDCCH candidates making up a search space in ePDCCH, the lower the configured aggregation level, the more ePDCCH candidates are precoded (blind decoded) using single antenna port transmission. On the other hand, the higher the configured aggregation level, the more ePDCCH candidates are precoded (blind decoded) using transmission diversity using multiple antenna ports. That is, base station 100 and terminal 200 can switch, in accordance with an aggregation level configured in each ePDCCH candidate, the transmission method to one appropriate to the aggregation level.

Thus, according to the present embodiment, it is possible to dynamically switch between transmission methods while avoiding an increase in the number of times blind decoding is performed in terminal 200 and an increase in the amount of signaling required to indicate a transmission method.

In the present embodiment, in order to enable uniquely identifying of antenna ports for transmission diversity using multiple antenna ports from antenna ports for single antenna port transmission indicated for each terminal 200, antenna ports to be used for both transmission methods may be associated with each other in advance. For example, FIG. 13 illustrates association between antenna ports for single antenna port transmission and antenna ports for transmission diversity using two antenna ports. In FIG. 13, base station 100 indicates 2-bit information (00, 01, 10, 11) to terminal 200, and terminal 200 can thereby uniquely identify antenna ports to be used for both transmission methods. As antenna ports for transmission diversity using two antenna ports, combinations of ports #7 and #9, and ports #8 and #10 may also be used. For example, while 3 bits (2 bits (4 types)+1 bit (2 types)) are necessary when antenna ports used for each transmission method are individually indicated, in FIG. 13, 2 bits are necessary, and therefore the number of bits can be reduced by 1 bit. Alternatively, only the same antenna ports (e.g., ports #7, #8, ports #9, #10 or ports #7, #9) may be configured beforehand to be always used as antenna ports for transmission diversity using multiple antenna ports.

A case has been described in the present embodiment where 32 ePDCCH candidates are used as shown, for example, in FIG. 9 and FIG. 10, but the number of ePDCCH candidates is not limited to 32. All of the ePDCCH candidates as targets of switching between transmission methods may be, for example, a region to which control information relating to downlink (DL) is mapped or a region to which control information relating to uplink (UL) is mapped or a region in which the regions to which control information relating to downlink (DL) and control information relating to uplink (UL) are mapped are mixed. For example, for each of aggregation levels 1, 2, 4 and 8, the number of ePDCCH candidates corresponding to downlink control information may be set to 6, 6, 2 and 2 respectively and the number of ePDCCH candidates corresponding to uplink control information may be set to 6, 6, 2 and 2 respectively. The total number of ePDCCH candidates is also 32 as in the cases of FIG. 9 and FIG. 10 in this case, too.

Figure 14:
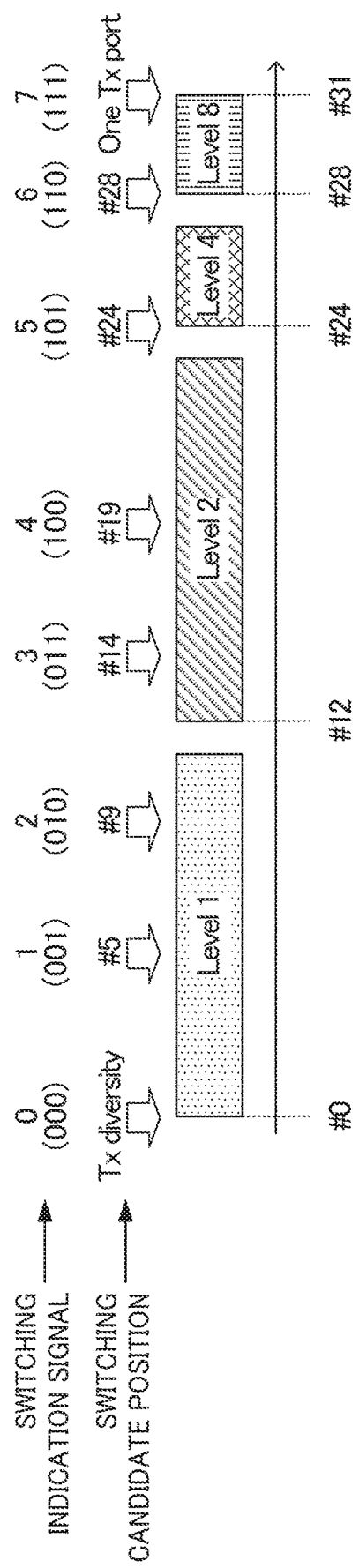
FIG. 14 illustrates another example of switching between transmission methods according to Embodiment 1 of the present invention.

In the present embodiment, an ePDCCH candidate for switching between transmission methods is indicated using 2 bits in operation example 1-1 and ceil ($\log_2(N+1)$) bits or ceil ($\log_2(N)$) bits in operation example 1-2 and operation example 1-3, but the present invention is not limited to this. For example, assuming that the number of indication bits is K, positions at which the number of ePDCCH candidates is divided by ($2^K-1$) may be indicated. FIG. 14 illustrates an example of K=3 (a case where the number of ePDCCH candidates is divided by 7). As shown in FIG. 14, eight types of switching indication signals 0 to 7 are represented by 3 bits. As shown in FIG. 14, when the switching indication signal is 0, transmission diversity (Tx diversity) of a plurality of antennas is configured for all ePDCCH candidates, and when the switching indication signal is 7, single antenna port transmission (One Tx port) is configured for all ePDCCH candidate positions. When the switching indication signal shown in FIG. 14 is one of 1 to 6, single antenna port transmission is configured for ePDCCH candidates assigned a number less than the ePDCCH candidate number of the ePDCCH candidate (switching candidate position) corresponding to the switching indication signal, and transmission diversity of a plurality of antennas is configured for ePDCCH candidates assigned numbers equal to or greater than the ePDCCH candidate number of the switching candidate position. The ePDCCH candidates (switching candidate positions) corresponding to switching indication signals 1 to 6 shown in FIG. 14 may be determined beforehand by higher layer signaling or determined through calculations. As an example of the case where the ePDCCH candidates are determined through calculations, an ePDCCH candidate corresponding to each switching indication signal may be calculated as Round((($N+1$)/($2^K-1$))*value of switching indication signal). Function Round(x) returns a value obtained by rounding off x to the nearest integer. For example, if N=32 and K=3 are assumed, switching indication signal 1 becomes ePDCCH candidate position #5, switching indication signal 2 becomes ePDCCH candidate position #9, switching indication signal 3 becomes ePDCCH candidate position #14, switching indication signal 4 becomes ePDCCH candidate position #19, switching indication signal 5 becomes ePDCCH candidate position #24, and switching indication signal 6 becomes ePDCCH candidate position #28. By so doing, the number of bits can be reduced compared to the case where ceil ($\log_2(N+1)$) bits are used.

The ePDCCH candidates (e.g., 32 ePDCCH candidates shown in FIG. 9 and FIG. 10) as targets of switching between transmission methods may be regions making up search spaces specific to terminal 200 (UE specific Search Space: UE-SS) or regions making up search spaces common to a plurality of terminals 200 (Common Search Space: C-SS) or a region in which regions making up UE-SS and C-SS respectively are mixed.

Embodiment 2

A case has been described in Embodiment 1 where the number of ePDCCH candidates corresponding to each aggregation level is configured beforehand. In contrast, a case will be described in the present embodiment where the number of ePDCCH candidates corresponding to each aggregation level is selected from among a plurality of candidates.

A base station and a terminal according to the present embodiment have basic configurations common to those of base station 100 and terminal 200 according to Embodiment 1, and therefore their basic configurations will be described with reference to FIGS. 7 and 8.

One of operation example 1-1 and operation example 1-2 of Embodiment 1 may be applied to switching between transmission methods in the present embodiment and description thereof will be omitted here.

Figure 15:
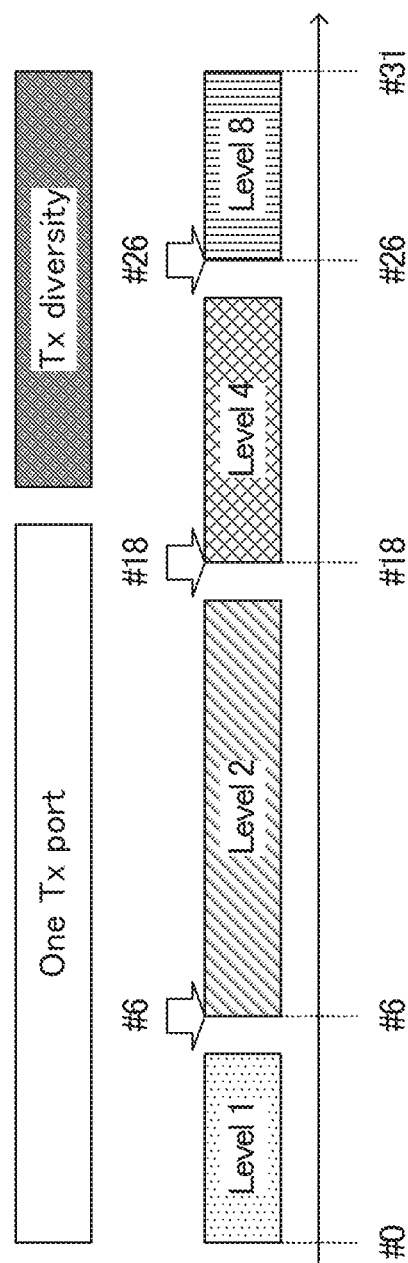
FIG. 15 illustrates an example of switching between transmission methods according to Embodiment 2 of the present invention.

For example, as shown in FIG. 15, as in the case of operation example 1-2 of Embodiment 1, for 32 ePDCCH candidates as shown in FIG. 15, ePDCCH candidate numbers #0 to #31 are assigned in ascending order from ePDCCH candidates corresponding to lower aggregation levels. However, the configuration of an aggregation level corresponding to each ePDCCH candidate is variable.

In base station 100, configuration section 102 configures ePDCCH candidates whose aggregation levels are switched. More specifically, configuration section 102 configures corresponding ePDCCH candidates at a switching position between aggregation levels 1 and 2, a switching position between aggregation levels 2 and 4, and a switching position between aggregation levels 4 and 8 respectively. For example, in FIG. 15, configuration section 102 configures ePDCCH candidate number #6 as a start position of aggregation level 2 (corresponding to the position of switching between aggregation levels 1 and 2). In FIG. 15, configuration section 102 configures ePDCCH candidate number #18 as a start position of aggregation level 4 (corresponding to the position of switching between aggregation levels 2 and 4). Likewise, in FIG. 15, configuration section 102 configures ePDCCH candidate number #26 as a start position of aggregation level 8 (corresponding to the position of switching between aggregation levels 4 and 8)

Configuration section 102 then outputs information indicating ePDCCH candidates (#6, #18 and #26) corresponding to the positions of switching between different aggregation levels to error correction coding section 103. This causes the information to be indicated to terminal 200.

On the other hand, in terminal 200, reception section 201 receives information indicating ePDCCH candidates (#6, #18 and #26) corresponding to the positions of switching between different aggregation levels. Control signal processing section 205 then configures an aggregation level for each of a plurality of ePDCCH candidates (#0 to #31) based on information indicating ePDCCH candidates (#6, #18 and #26) corresponding to the positions of switching between different aggregation levels.

By so doing, in base station 100 and terminal 200, as shown in FIG. 15, ePDCCH candidate numbers #0 to #5 are configured for aggregation level 1, ePDCCH candidate numbers #6 to #17 are configured at aggregation level 2, ePDCCH candidate numbers #18 to #25 are configured at aggregation level 4, and ePDCCH candidate numbers #26 to #31 are configured at aggregation level 8.

Here, the total number of ePDCCH candidates is assumed to be N and aggregation levels are assumed to be 1, 2, 4 and 8, and since switching between aggregation levels is indicated by three ePDCCH candidate numbers, the number of bits necessary for indication is 3*ceil (log$_2$(N+1)) bits. For example, in FIG. 15, N=32 and therefore 3*ceil (log$_2$(N+1))=18 bits.

Note that when #N (#32 in FIG. 15) is indicated with all three ePDCCH candidate numbers from base station 100 to terminal 200, aggregation levels may be assumed to be 1 for all ePDCCH candidates, and when #0 is indicated with all three ePDCCH candidate numbers, aggregation levels corresponding to all ePDCCH candidates may be assumed to be 8.

When a range of indicating ePDCCH candidates indicating switching between aggregation levels is assumed to be #0 to #N−1 and #N−1 (#31 in FIG. 15) is indicated from base station 100 to terminal 200, aggregation levels corresponding to all ePDCCH candidates may be assumed to be 8. In this case, the number of bits necessary to indicate switching between aggregation levels is 3*ceil (log$_2$(N)) bits. For example, in FIG. 15, since N=32, 3*ceil (log$_2$(N)) =15 bits, and the number of bits is reduced by 3 bits compared to the case with 3*ceil (log$_2$(N+1)).

Thus, terminal 200 identifies an aggregation level configured in each ePDCCH candidate by being indicated by the base station of the ePDCCH candidate number corresponding to the position of switching between aggregation levels. Thus, compared to the case as shown in FIG. 4 where the transmission method is indicated for each ePDCCH candidate, it is possible to reduce the number of bits necessary to indicate aggregation levels from 2*N bits (64 bits in FIG. 4) to 3*ceil (log$_2$(N+1)) bits or 3*ceil (log$_2$(N)) bits (18 bits or 15 bits).

For a plurality of ePDCCH candidates making up search spaces in ePDCCH, base station 100 may configure an ePDCCH candidate number corresponding to the position of switching between different aggregation levels to be variable. For example, base station 100 may configure ePDCCH candidate numbers corresponding to the position of switching between different aggregation levels so that the ratio of the number of ePDCCH candidates corresponding to aggregation levels more frequently used to the total number of a plurality of ePDCCH candidates is higher. For example, when the number of REs is high, the number of ePDCCH candidates corresponding to low aggregation levels may be increased and when the number of REs is small, the number of ePDCCH candidates corresponding to high aggregation levels may be increased. In this way, it is possible to reduce the number of ePDCCH candidates corresponding to aggregation levels less frequently used and increase the number of ePDCCH candidates corresponding to aggregation levels more frequently used. That is, a degree of freedom can be provided in the selection of the numbers of ePDCCH candidates making up aggregation levels 1, 2, 4 and 8 respectively. Thus, base station 100 and terminal 200 can configure an aggregation level appropriate for each cell or terminal 200 without changing the total number of ePDCCH candidates and reduce a probability of collision of ePDCCH candidates among a plurality of terminals 200.

Embodiment 3

The present embodiment will describe a case where search spaces similar to shared search spaces (common search spaces: C-SS) in PDCCH are configured in ePDCCH.

In the following description, a search space in ePDCCH is called "eC-SS (enhanced common search space)" to be distinguished from C-SS of PDCCH.

As in the case of C-SS of PDCCH, configuration of eC-SS of ePDCCH has two applications: (1) to effectively use resource regions by sharing search spaces of control signals received individually by terminals (UE) and (2) to transmit/receive control signals (e.g., system information, paging) received in common among terminals.

In above-described application (1), control signals intended for individual terminals are mapped to ePDCCH candidates in eC-SS. Therefore, when a certain terminal does not use any ePDCCH region, it is possible to effectively use resources by allocating the ePDCCH region to other terminals. In above-described application (1), antenna ports may be shared among a plurality of terminals. Therefore, when multiple antenna ports for transmission diversity are configured in each terminal, multiplexing among terminals becomes easier. Thus, transmission diversity using multiple antenna ports is effective for above-described application (1).

In above-described application (2), common control signals for a plurality of terminals are mapped to ePDCCH candidates in eC-SS. For this reason, it is necessary to relatively improve receiving quality of ePDCCH so as to allow a plurality of terminals to receive signals. Thus, in above-described application (2), only high aggregation levels (e.g., levels 4 and 8) may be used in eC-SS. Thus, transmission diversity using multiple antenna ports is also effective for above-described application (2) to obtain a diversity gain for high aggregation levels (e.g., levels 4 and 8).

Thus, in the present embodiment, eC-SS is configured in ePDCCH such that more ePDCCH candidates to be precoded (blind-decoded) using transmission diversity using multiple antenna ports are configured.

Note that a base station and a terminal according to the present embodiment have basic configurations common to those of base station 100 and terminal 200 according to Embodiment 1, and therefore their configurations will be described with reference to FIGS. 7 and 8.

Hereinafter, operation example 3-1 and operation example 3-2 of base station 100 and terminal 200 according to the present embodiment will be described.

Operation Example 3-1

In operation example 3-1, transmission diversity using multiple antenna ports is configured as a transmission method for ePDCCH candidates corresponding to eC-SS irrespective of aggregation levels.

By so doing, terminal 200 can identify a transmission method without additional signaling for the transmission method. For example, even when single antenna port transmission is configured in search spaces (UE-SS) specific to terminal 200, terminal 200 can configure transmission diversity using multiple antenna ports in eC-SS.

Operation Example 3-2

In operation example 3-2 as well as operation example 1-2 of Embodiment 1, ePDCCH candidate numbers are assigned in ascending order from ePDCCH candidates corresponding to low aggregation levels to ePDCCH candidates corresponding to high aggregation levels.

However, ePDCCH candidates corresponding to eC-SS are assigned numbers higher than ePDCCH candidate numbers corresponding to UE-SS.

Figure 16:
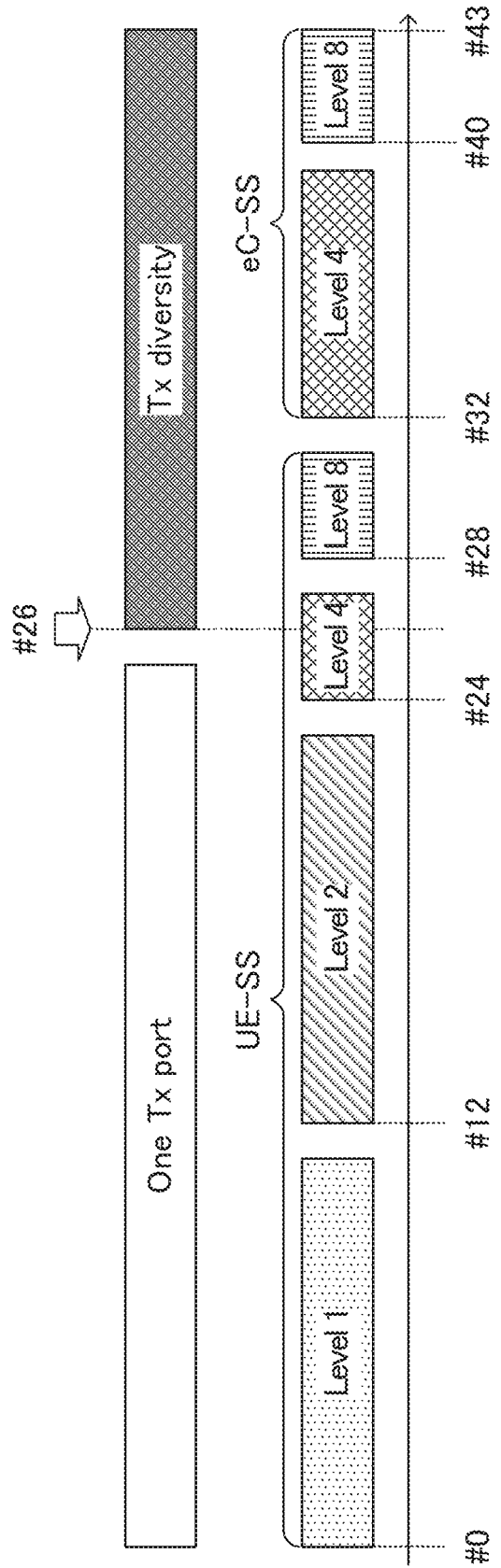
FIG. 16 illustrates an example of switching between transmission methods according to Embodiment 3 of the present invention.

The following description assumes, as an example, that as shown in FIG. 16, the numbers of ePDCCH candidates for aggregation levels 1, 2, 4 and 8 of UE-SS are 12, 12, 4 and 4 respectively, and the numbers of ePDCCH candidates for aggregation levels 4 and 8 of eC-SS are 8 and 4 respectively. That is, in FIG. 16, the plurality of ePDCCH candidates constituting search spaces in ePDCCH are composed of 32 ePDCCH candidates in UE-SS and 12 ePDCCH candidates in eC-SS, and the total number of ePDCCH candidates is 44. Control signals specific to terminal 200 are mapped to UE-SS. On the other hand, common control signals for a plurality of terminals 200 or control signals specific to terminal 200 are mapped to eC-SS.

In this case, as shown in FIG. 16, 32 UE-SS ePDCCH candidates are assigned ePDCCH candidate numbers #0 to #31 in ascending order from ePDCCH candidates corresponding to low aggregation levels. More specifically, as shown in FIG. 16, ePDCCH candidate numbers #0 to #11 correspond to UE-SS aggregation level 1, ePDCCH candidate numbers #12 to #23 correspond to UE-SS aggregation level 2, ePDCCH candidate numbers #24 to #27 correspond to UE-SS aggregation level 4, and ePDCCH candidate numbers #28 to #31 correspond to UE-SS aggregation level 8.

As shown in FIG. 16, 12 eC-SS ePDCCH candidates are assigned ePDCCH candidate numbers #32 to #43 higher than the maximum number assigned to an ePDCCH candidate included in UE-SS (ePDCCH candidate number #31) in ascending order from ePDCCH candidates corresponding to lower aggregation levels. More specifically, as shown in FIG. 16, ePDCCH candidate numbers #32 to #38 correspond to eC-SS aggregation level 4 and ePDCCH candidate numbers #40 to #43 correspond to eC-SS aggregation level 8.

Here, as shown in FIG. 16, as in the case of operation example 1-2 of Embodiment 1, a case will be described where ePDCCH candidate number #26 corresponding to UE-SS aggregation level 4 is indicated from base station 100 to terminal 200 as an ePDCCH candidate number for switching between transmission methods (reference for switching between transmission methods of ePDCCH).

In this case, in base station 100, precoding section 105 performs precoding processing on ePDCCH candidates (#0 to #25) assigned ePDCCH candidate numbers lower than #26 as shown in FIG. 16 using single antenna port transmission and performs precoding processing on ePDCCH candidates (#26 to #43) assigned ePDCCH candidate numbers equal to or higher than #26 using transmission diversity using 2 antenna ports.

On the other hand, in terminal 200, reception section 201 receives ePDCCH candidate number #26 as information relating to switching between transmission methods of ePDCCH from base station 100. Thus, as shown in FIG. 16, control signal processing section 205 performs blind decoding on ePDCCH candidates (#0 to #25) assigned ePDCCH candidate numbers lower than #26 using single antenna port transmission and performs blind decoding on ePDCCH candidates (#26 to #43) assigned ePDCCH candidate numbers equal to or higher than #26 using transmission diversity using 2 antenna ports.

Here, if the total number of ePDCCH candidates is assumed to be N, the number of bits necessary to indicate an ePDCCH candidate which becomes the above-described reference for switching between transmission methods is ceil ($\log_2(N+1)$) bits. For example, since N=44 in FIG. 16, ceil ($\log_2(N+1)$)=6 bits.

As in the case of operation example 1-2 of Embodiment 1, when #N (#44 in FIG. 16) is indicated from base station 100 to terminal 200, single antenna port transmission may be adopted as the transmission method for all ePDCCH candidates and when #0 is indicated, transmission diversity using multiple antenna ports may be adopted as the transmission method for all ePDCCH candidates.

As in the case of operation example 1-2 of Embodiment 1, if the range of indication of an ePDCCH candidate which becomes the above-described reference for switching between transmission methods is assumed to be #0 to #N−1 and #N−1 (#43 in FIG. 16) is indicated from base station 100 to terminal 200, single antenna port transmission may be adopted as the transmission method for all ePDCCH candidates. In this case, the number of bits necessary to indicate the ePDCCH candidate which becomes the above-described reference for switching between transmission methods is ceil ($\log_2(N)$) bits. For example, since N=44 in FIG. 16, ceil ($\log_2(N)$)=6 bits.

Thus, as in the case of Embodiment 1, terminal 200 can identify a transmission method by being indicated from base station 100 of the ePDCCH candidate number which becomes a reference for switching between transmission methods. Thus, compared to the case shown in FIG. 4 where the transmission method is indicated for each ePDCCH candidate, it is possible to reduce the number of bits necessary to indicate switching between transmission methods (Tx diversity or not) from N bits (here, N=44 bits) to ceil ($\log_2(N+1)$) bits or ceil ($\log_2(N)$) bits (6 bits in FIG. 16).

As shown in FIG. 16, by assigning higher numbers than ePDCCH candidates (#0 to #31) corresponding to UE-SS to ePDCCH candidates (#32 to #43) corresponding to eC-SS, base station 100 and terminal 200 can more easily apply transmission diversity using multiple antenna ports to ePDCCH candidates corresponding to eC-SS. For this reason, it is possible to obtain diversity gains with eC-SS and carry out communication appropriate for above-described application (2).

Depending on the configuration of a ePDCCH candidate number which becomes a reference for switching between transmission methods, it is also possible to switch between single antenna port transmission and transmission diversity using multiple antenna ports using one of ePDCCH candidates corresponding to eC-SS. For example, FIG. 16 corresponds to a case where one of #33 to #42 is configured as an ePDCCH candidate number which becomes a reference for switching between transmission methods. In this case, transmission by precoding in accordance with feedback (that is, single antenna port transmission) is applicable to some ePDCCH candidates of eC-SS. Thus, some ePDCCH candidates of eC-SS can be used as UE-SS and communication appropriate for above-described application (1) is possible.

Thus, for example, base station 100 can switch between the number of ePDCCH candidates used as search spaces specific to terminal 200 and the number of ePDCCH candidates used as common search spaces among terminals in eC-SS in accordance with the number of terminals in a cell or a communication situation.

In the present embodiment, as in the case of operation example 1 of Embodiment 1, when ePDCCH candidate numbers are assigned in ascending order from ePDCCH candidates corresponding to aggregation levels lower than L (L is a natural number) to ePDCCH candidates corresponding to aggregation levels equal to or higher than L, numbers may be assigned in ascending order from mapping candidates corresponding to aggregation levels lower than L for ePDCCH candidates of UE-SS and ePDCCH candidate numbers may be assigned in ascending order from a maximum number assigned to an ePDCCH candidate included in UE-SS for ePDCCH candidates of eC-SS.

Embodiment 4

The present embodiment uses a method of allocating ePDCCHs (localized allocation and distributed allocation) as a reference for switching between single antenna port transmission (One Tx port) and transmission diversity using multiple antenna ports (Tx diversity).

Note that a base station and a terminal according to the present embodiment have basic configurations common to those of base station 100 and terminal 200 according to Embodiment 1, and therefore their configurations will be described with reference to FIGS. 7 and 8.

As described above, localized allocation is an allocation method to obtain a frequency scheduling gain and can allocate ePDCCHs to resources of good channel quality based on channel quality information. On the other hand, distributed allocation can distribute ePDCCHs on the frequency axis and obtain a frequency diversity gain. That is, both localized allocation and single antenna port transmission have an effect of improving receiving quality for one terminal (UE), and both distributed allocation and transmission diversity using multiple antenna ports have an effect of stabilizing receiving quality. That is, localized allocation and single antenna port transmission are more likely to be used for when reliability of feedback information is relatively high, whereas distributed allocation and transmission diversity using multiple antenna ports are more likely to be used for when reliability of feedback information is relatively low.

Figure 17:
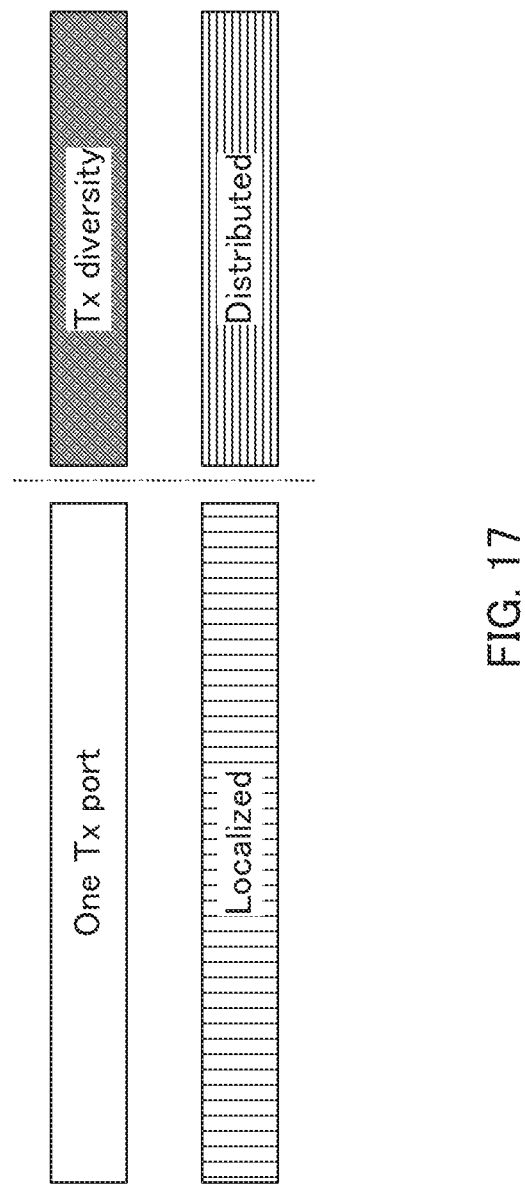
FIG. 17 is a diagram provided for describing switching between conventional transmission methods.

Thus, as shown in FIG. 17, a related art proposes to apply single antenna port transmission as the transmission method using ePDCCH in localized allocation, and apply transmission diversity using multiple antenna ports as the transmission method using ePDCCH in distributed allocation (e.g., see NPL 4).

The present embodiment will describe a method using a combination of allocation method and transmission method to allow control signals to be more flexibly allocated from base station 100 to terminal 200.

Hereinafter, operation examples 4-1 and 4-2 of base station 100 and terminal 200 according to the present embodiment will be described.

Operation Example 4-1

Figure 18:
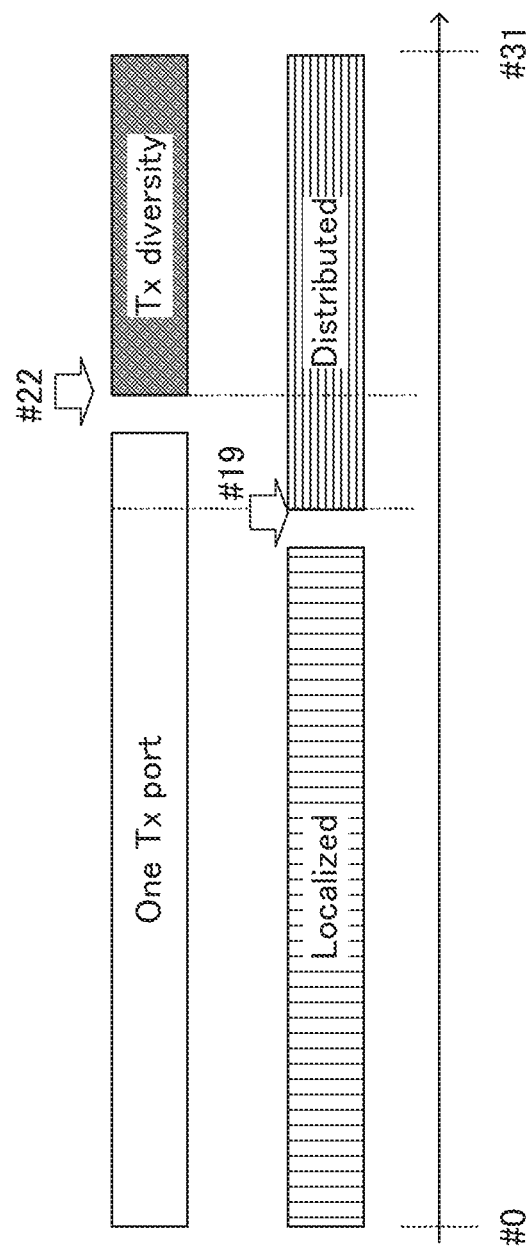
FIG. 18 illustrates an example of switching between transmission methods according to Embodiment 4 of the present invention (operation example 4-1)

In operation example 4-1, base station 100 indicates, to terminal 200, an ePDCCH candidate for switching between allocation methods of ePDCCH and an ePDCCH candidate for switching between transmission methods. As shown in FIG. 18, 32 ePDCCH candidates will be described below.

For example, in base station 100, configuration section 102 configures ePDCCH candidate number #22 as a reference for switching between transmission methods of ePDCCH. Configuration section 102 also configures ePDCCH candidate number #19 as a reference for switching between allocation methods of ePDCCH. Configured ePDCCH candidate numbers #22 and #19 are indicated as control signals to terminal 200. For example, higher layer signaling is used for this indication.

As shown in FIG. 18, precoding section 105 performs precoding processing on ePDCCH candidates (#0 to #21) assigned ePDCCH candidate numbers lower than #22 using single antenna port transmission and performs precoding processing on ePDCCH candidates (#22 to #31) assigned ePDCCH candidate numbers equal to or higher than #22 using transmission diversity using multiple antenna ports. On the other hand, as shown in FIG. 18, signal assignment section 106 allocates control signals to resources for ePDCCH candidates (#0 to #18) assigned ePDCCH candidate numbers lower than #19 using localized allocation, and allocates control signals to resources for ePDCCH candidates (#19 to #31) assigned ePDCCH candidate numbers equal to or higher than #19 using distributed allocation.

On the other hand, in terminal 200, control signal processing section 205 receives ePDCCH candidate number #22 as information relating to switching between transmission methods of ePDCCH from base station 100 and receives ePDCCH candidate number #19 as information relating to switching between allocation methods of ePDCCH.

Thus, as shown in FIG. 18, control signal processing section 205 performs blind decoding on ePDCCH candidate numbers #0 to #18 assuming single antenna port transmission and localized allocation. On the other hand, as shown in FIG. 18, control signal processing section 205 performs blind decoding on ePDCCH candidate numbers #19 to #21 assuming single antenna port transmission and distributed allocation. As shown in FIG. 18, control signal processing section 205 performs blind decoding on ePDCCH candidate numbers #22 to #31 assuming transmission diversity using multiple antenna ports and distributed allocation.

Here, when the total number of ePDCCH candidates is assumed to be N, the number of bits necessary to indicate an ePDCCH candidate which becomes a reference for switching between transmission methods and an ePDCCH candidate which becomes a reference for switching between allocation methods is $2*\text{ceil}(\log_2(N+1))$ bits. For example, since N=32 in FIG. 18, $2*\text{ceil}(\log_2(N+1))=12$ bits.

Note that when #N (#32 in FIG. 10) is indicated from base station 100 to terminal 200 as a transmission method or allocation method, single antenna port transmission or localized allocation may be adopted as a transmission method for all ePDCCH candidates, and when #0 is indicated, transmission diversity using multiple antenna ports or distributed allocation may be adopted as a transmission method for all ePDCCH candidates.

In this way, terminal 200 can identify a transmission method by being indicated from base station 100 of ePDCCH candidate numbers which become references for switching between the transmission method and allocation method. For example, compared to a case where a transmission method is indicated for each ePDCCH candidate as shown in FIG. 4, it is possible to reduce the number of bits necessary to indicate switching between transmission methods (Tx diversity or not) from N bits (32 bits in FIG. 4) to $\text{ceil}(\log_2(N+1))$ bits (6 bits in FIG. 18). Similarly, compared to a case where an allocation method is indicated for each ePDCCH candidate as shown in FIG. 4, it is possible to reduce the number of bits necessary to indicate switching between allocation methods (localized or distributed) from N bits (32 bits in FIG. 18) to $\text{ceil}(\log_2(N+1))$ bits (6 bits in FIG. 18).

Among a plurality of ePDCCH candidates making up search spaces in ePDCCH, ePDCCH candidates corresponding to localized allocation are more likely to be precoded (blind decoded) using single antenna port transmission and ePDCCH candidates corresponding to distributed allocation are more likely to be precoded (blind decoded) using transmission diversity using multiple antenna ports. That is, base station 100 and terminal 200 can select, according to the allocation method configured for each ePDCCH candidate, a transmission method appropriate for the allocation method. That is, the present embodiment can improve receiving quality of ePDCCH by securing more ePDCCH candidates for which a combination of single antenna port transmission and localized allocation or a combination of transmission diversity using multiple antenna ports and distributed allocation.

When the related art (FIG. 17) is compared with operation example 4-1 (FIG. 18), as shown in FIG. 17, the related art can apply only a combination of localized allocation and single antenna port transmission, and a combination of distributed allocation and transmission diversity using multiple antenna ports. In contrast, in operation example 4-1, a combination of distributed allocation and single antenna port transmission (see FIG. 18), and a combination (not shown) of localized allocation and transmission diversity using multiple antenna ports are also supported. Thus, it is possible to more flexibly allocate control signals from base station 100 to terminal 200.

For example, when feedback information including average CQI (Channel Quality Indicator: channel quality information) of a whole band and PMI (Precoding Matrix Indicator) of a whole band is fed back from terminal 200, a combination of distributed allocation and single antenna port transmission (ePDCCH candidate numbers #19 to #21 shown in FIG. 18) is effective. In this case, to acquire CQI of the whole band, since localized allocation whereby a frequency scheduling gain can be obtained cannot be selected, single antenna port transmission is applied whereby better precoding is selected from PMI while performing distributed allocation. For example, in the case of transmission diversity using multiple antenna ports, distributed allocation may be always configured. This can be done, for example, by configuring an ePDCCH candidate number which becomes a reference for switching between transmission methods to be higher than an ePDCCH candidate number which becomes a reference for switching between allocation methods. In this way, the combination of distributed allocation and single antenna port transmission can be secured.

For example, by localized allocation in a certain terminal and distributed allocation using transmission diversity in other terminals (UEs), when signals of both sides are mapped to the same RB pair, antenna ports can be shared among a plurality of terminals, and therefore a combination of localized allocation and transmission diversity using multiple antenna ports is effective.

In operation example 4-1, it is also possible to adopt operation in which single antenna port transmission or localized allocation is configured for all ePDCCH candidates and operation in which transmission diversity using multiple antenna ports or distributed allocation is configured for all ePDCCH candidates. Thus, all ePDCCH candidates can be effectively used even when there is terminal 200 or base station 100 that supports only one transmission method or allocation method.

Furthermore, in operation example 4-1, a transmission method and an allocation method can be switched for each ePDCCH candidate using ePDCCH candidate numbers which become references for switching between transmission methods and between allocation methods as boundaries. In this way, compared to the case where only one transmission method or one allocation method can be configured by higher layer signaling as in the case of R-PDCCH, dynamic switching between transmission methods or allocation methods by ePDCCH is possible.

A case has been described in FIG. 18 where ePDCCH candidate numbers which become references for switching between transmission methods and allocation methods are configured respectively. However, for example, base station 100 may configure an ePDCCH candidate number which becomes a switching reference for one of a transmission method and an allocation method, configure a distance (number width) from the configured ePDCCH candidate number, and thereby identify an ePDCCH candidate number which becomes the other switching reference. That is, an ePDCCH candidate number which becomes a switching reference for one of the transmission method and allocation method and the distance for identifying the other switching reference may be indicated from base station 100 to terminal 200.

Operation Example 4-2

A case will be described in operation example 4-2 where Embodiments 1 to 3 and operation example 4-1 are combined. Here, although a case will be described as an example where operation example 1-2 of Embodiment 1 and operation example 4-1 are combined, without being limited to this combination, other operation examples may also be combined with each other.

Figure 19:
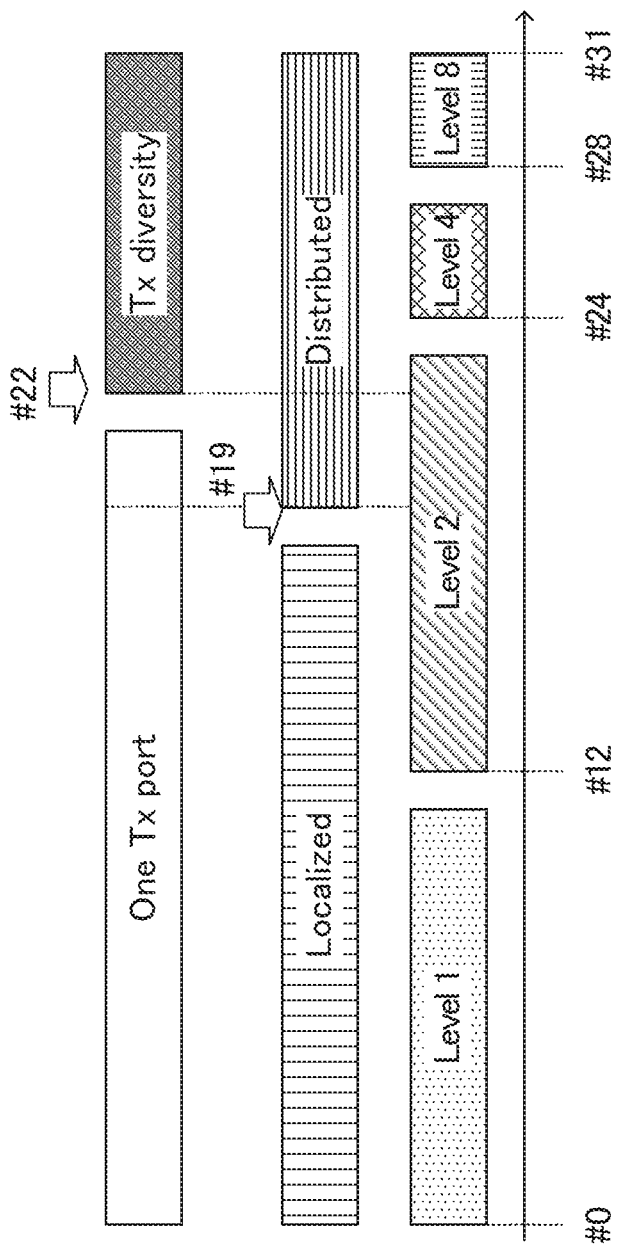
FIG. 19 illustrates an example of switching between transmission methods according to Embodiment 4 of the present invention (operation example 4-2)

For example, as shown in FIG. 19, ePDCCH candidates with ePDCCH candidate numbers #0 to #11 correspond to aggregation level 1, ePDCCH candidates with ePDCCH candidate numbers #12 to #23 correspond to aggregation level 2, ePDCCH candidates with ePDCCH candidate numbers #24 to #27 correspond to aggregation level 4 and ePDCCH candidates with ePDCCH candidate numbers #28 to #31 correspond to aggregation level 8.

In FIG. 19, in base station 100, configuration section 102 configures ePDCCH candidate number #22 corresponding to aggregation level 2 as a reference for switching between transmission methods of ePDCCH. Furthermore, configuration section 102 configures ePDCCH candidate number #19 as a reference for switching between allocation methods of ePDCCH.

Thus, as shown in FIG. 19, control signal processing section 205 of terminal 200 identifies a transmission method, allocation method and aggregation level of each of ePDCCH candidate numbers #0 to #31 and performs blind decoding based on the identified configuration.

By so doing, in operation example 4-2, effects similar to those of operation example 1-2 and operation example 4-1 can be achieved.

Embodiment 5

A method for indicating a DCI format will be described in the present embodiment.

Note that a base station and a terminal according to the present embodiment have basic configurations common to those of base station 100 and terminal 200 according to Embodiment 1, and therefore their configurations will be described with reference to FIGS. 7 and 8.

In ePDCCH, one transmission mode is configured for downlink (DL) and uplink (UL) for each terminal. Each terminal performs blind decoding (monitoring) on ePDCCH in a DCI format for UL grant and a DCI format for DL assignment.

For example, in C-SS (common search space), a terminal performs blind decoding on two sizes (DCI sizes) of DCI format. For example, the terminal performs blind decoding 6 times (4 times and 2 times for respective aggregation levels 4 and 8) for each DCI size.
 (1) DCI format 0/1A/3/3A (these are of the same size)
 (2) DCI format 1C
For example, in UE-SS (UE specific search space), the DCI format in which the terminal performs blind decoding differs depending on the transmission mode.

More specifically, when the transmission mode is a UL single antenna port mode, the terminal performs blind decoding on DCI formats of two DCI sizes. For example, the terminal performs blind decoding on each DCI size 16 times (6 times, 6 times, 2 times and 2 times for respective aggregation levels 1, 2, 4 and 8).

(1) DCI format 0/1A
 (2) DCI format X (downlink transmission mode dependent DCI, candidates for X are 1B, 1D, 1, 2, 2A, 2B and 2C)

On the other hand, when the transmission mode is a UL multi antenna port mode, the terminal performs blind decoding on DCI formats of the following 3 DCI sizes. For example, the terminal performs blind decoding on each DCI size 16 times (6 times, 6 times, 2 times and 2 times for respective aggregation levels 1, 2, 4 and 8).
 (1) DCI format 0/1A
 (2) DCI format X (downlink transmission mode dependent DCI)
 (3) DCI format Y (uplink transmission mode dependent DCI, a candidate for Y is 4 (in case of 3GPP rel. 10))

Studies are currently being carried out on whether or not all the aforementioned DCIs are supported for ePDCCH, but one DCI is configured for at least each of DCI for DL assignment and DCI for UL grant in the terminal.

The present embodiment associates each of a plurality of ePDCCH candidates making up search spaces in ePDCCH with types of size (DCI sizes) of a plurality of DCI formats. This allows terminal 200 to identify a DCI format of what DCI size is assigned based on an ePDCCH candidate number. That is, terminal 200 performs blind decoding on only DCI formats of DCI sizes identified in each ePDCCH candidate.

First, C-SS will be described.

For two types of DCI format of different DCI sizes (DCI formats 0/1A/3/3A (these are of the same size) and DCI format 1C), base station 100 and terminal 200 associate, for example, DCI format 0/1A/3/3A with even-numbered ePDCCH candidate numbers and associate DCI format 1C with odd-numbered ePDCCH candidate numbers.

Thus, for example, in terminal 200, control signal processing section 205 performs blind decoding assuming DCI format 0/1A/3/3A on ePDCCH candidates whose modulo operation (ePDCCH candidate number mod 2)=0 and performs blind decoding assuming DCI format 1C on ePDCCH candidates whose (ePDCCH candidate number mod 2)=1.

Next, UE-SS will be described.

For two types of DCI format (DCI format 0/1A (these are of the same size) and DCI format X (downlink transmission mode dependent DCI)) of different DCI sizes, base station 100 and terminal 200 associate, for example, DCI format 0/1A with even-numbered ePDCCH candidate numbers and associate DCI format X with odd-numbered ePDCCH candidate numbers.

Thus, for example, in terminal 200, control signal processing section 205 performs blind decoding assuming DCI format 0/1A on ePDCCH candidates whose modulo operation (ePDCCH candidate number mod 2)=0 and performs blind decoding assuming DCI format X on ePDCCH candidates whose (ePDCCH candidate number mod 2)=1.

On the other hand, for three types of DCI format (DCI format 0/1A (these are of the same size), DCI format X (downlink transmission mode dependent DCI) and DCI format Y (uplink transmission mode dependent DCI)) of different DCI sizes, base station 100 and terminal 200 associate, for example, DCI format 0/1A with ePDCCH candidates whose modulo operation (ePDCCH candidate number mod 3)=0, associate DCI format X with ePDCCH candidates whose (ePDCCH candidate number mod 3)=1 and associate DCI format Y with ePDCCH candidates whose (ePDCCH candidate number mod 3)=2.

Thus, for example, in terminal 200, control signal processing section 205 performs blind decoding assuming DCI format 0/1A on ePDCCH candidates whose (ePDCCH candidate number mod 3)=0, performs blind decoding assuming DCI format X on ePDCCH candidates whose (ePDCCH candidate number mod 3)=1 and performs blind decoding assuming DCI format Y on ePDCCH candidates whose (ePDCCH candidate number mod 3)=2.

By so doing, terminal 200 can identify a DCI size which is a blind decoding target based on the ePDCCH candidate number, and signaling for DCI format indication is unnecessary. For example, compared to a case as shown in FIG. 4 where a DCI format is indicated for each ePDCCH candidate, it is possible to reduce the number of bits necessary to indicate the DCI format from N bits (32 bits in FIG. 4) in the case of two types and 2 N bits (64 bits in FIG. 4) in the case of three types to 0 bits.

When the present embodiment is combined with, for example, Embodiments 1 to 4, it is possible to uniformly assign DCI formats of different DCI sizes to each transmission method, each aggregation level or each allocation method. As an example, in operation example 1-2 of Embodiment 1, ePDCCH candidate numbers are assigned in ascending order from ePDCCH candidates corresponding to lower aggregation levels. Thus, for example, by associating ePDCCH candidate numbers with DCI sizes based on modulo operation corresponding to ePDCCH candidate numbers, it is possible to uniformly assign different DCI sizes among a plurality of aggregation levels.

In the present embodiment, for example, when the number of resources of ePDCCH candidates at aggregation level 1 is small, only DCI format 0/1A may be supported at the aggregation level of UE-SS.

Figure 20:
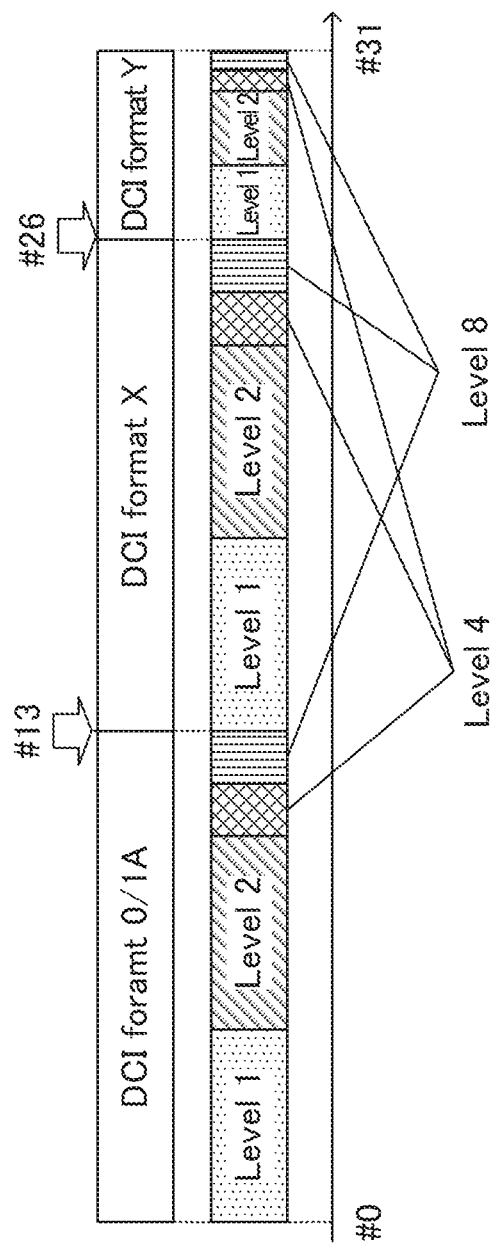
FIG. 20 illustrates an example of switching between transmission methods according to Embodiment 5 of the present invention.

A case has been described in the present embodiment where ePDCCH candidate numbers are associated with DCI sizes based on modulo operations on ePDCCH candidate numbers, but an ePDCCH candidate number for switching between DCI formats may be indicated from base station 100 to terminal 200. For example, in FIG. 20, ePDCCH candidate number #13 is indicated as a position of switching between DCI format 0/1A and DCI format X, and ePDCCH candidate number #26 is indicated as a position of switching between DCI format X and DCI format Y. As shown in FIG. 20, when a ratio of the number of ePDCCH candidates corresponding to each aggregation level is configured, each DCI format is assigned a number of ePDCCH candidates corresponding to the ratio of the number of ePDCCH candidates at each aggregation level respectively. For example, in FIG. 20, 13 ePDCCH candidates with ePDCCH candidate numbers #0 to #12 corresponding to DCI format 0/1A, 13 ePDCCH candidates with ePDCCH candidate numbers #13 to #25 corresponding to DCI format X and 6 ePDCCH candidates with ePDCCH candidate numbers #26 to #31 corresponding to DCI format Y0/1A are assigned to each aggregation level respectively in accordance with the ratio.

Embodiment 6

A case will be described in the present embodiment where transmission diversity using single antenna port is supported.

Note that a base station and a terminal according to the present embodiment have basic configurations common to those of base station 100 and terminal 200 according to Embodiment 1, and therefore their configurations will be described with reference to FIGS. 7 and 8.

Transmission diversity using single antenna port is, for example, RBF (Random Beam Forming) and CDD. In RBF, a diversity gain of precoding can be obtained by changing precoding for each RB in the frequency domain or time domain. In CDD, a frequency diversity gain can be obtained by changing a channel in the frequency domain.

Here, within the range in which channel estimation accuracy does not deteriorate, if antenna ports to be used are not changed between transmission diversity using single antenna port and single antenna port transmission (that is, transmission by precoding based on feedback), the base station can switch between transmission methods without being noticed by the terminal. That is, since the terminal performs channel estimation in RB pairs or in units of a plurality of RBs, the terminal can receive signals without being aware of transmission diversity using single antenna port or single antenna port transmission that performs feedback-based precoding as long as the amount of variation within the range in which channel estimation is performed is such an extent that does not affect deterioration of channel estimation accuracy.

In transmission diversity using single antenna port, power is concentrated on single antenna port in RS (Reference Signal), and it is thereby possible to improve channel estimation accuracy compared to SFBC using two or more antenna ports or transmission diversity using multiple antenna ports such as long delay CDD.

However, if antenna ports assigned as terminal-specific ones for single antenna port transmission for feedback-based precoding are used as antenna ports for transmission diversity using single antenna port as they are, it is difficult to share RSs among terminals. This leads to a problem that RS power is distributed to multiple antenna ports. For example, a case will be described where a terminal assigned antenna port 7 for single antenna port transmission and a terminal assigned antenna port 8 are CDM-multiplexed (Code Division Multiplexing) using the same RB pair. In this case, also at the time of transmission diversity using single antenna port, if the above-described antenna ports are used as they are, both CDM-multiplexed antenna ports 7 and 8 are used and RS power is thereby distributed and RS power at each antenna port decreases.

The aforementioned problem with power may possibly occur in a combination of CDM-multiplexed antenna ports 7 and 8 or a combination of antenna ports 9 and 10 in particular. That is, RS power is distributed to the antenna ports in such combinations of antenna ports.

Here, in single antenna port transmission that performs feedback-based precoding, it is necessary to vary precoding by assigning antenna ports differing from one terminal to another to regions having good receiving quality. On the other hand, in transmission diversity using single antenna port, it is preferable to concentrate RS power using the same antenna port among terminals in a region having poor receiving quality.

Moreover, since QPSK modulation is assumed to be applied in ePDCCH, even when RS power differs from ePDCCH power, the terminal can receive ePDCCH.

As described above, when a low aggregation level (e.g., level 1 or 2) is used, single antenna port transmission that selects precoding based on feedback information is effective. On the other hand, when a high aggregation level (e.g., level 4 or 8) is used, transmission diversity is effective to obtain a diversity gain.

Thus, in the present embodiment, base station 100 switches between antenna ports to be used in accordance with the aggregation level.

Furthermore, as shown in FIG. 21, base station 100 indicates antenna ports to be used in 2 bits (00, 01, 10, 11) to each terminal 200.

As shown in FIG. 21, while one of antenna ports 7, 8, 9 and 10 is used at aggregation levels 1 and 2, one of antenna ports 7 and 9 is used at aggregation levels 4 and 8. More specifically, as shown in FIG. 21, different antenna ports 7 and 8 are configured with '00' and '01' at aggregation levels 1 and 2, whereas at aggregation levels 4 and 8, the same antenna port 7 is configured. Similarly, as shown in FIG. 21, different antenna ports 9 and 10 are configured with '10' and '11' at aggregation levels 1 and 2, whereas at aggregation levels 4 and 8, the same antenna port 9 is configured.

By so doing, different antenna ports are assigned to different terminals 200 at low aggregation levels (levels 1 and 2 in FIG. 21). Therefore, in the case of single antenna port transmission that performs feedback-based precoding, different precoding can be configured for terminals 200.

On the other hand, at high aggregation levels (levels 4 and 8 in FIG. 21), the same antenna port is assigned to different terminals 200. Thus, when terminals 200 using transmission diversity using single antenna port are multiplexed in the same RB pair, it is possible to share the same antenna port and concentrate and increase power per RS antenna port, and thereby improve channel estimation accuracy.

When antenna ports to be used do not change depending on the aggregation level (e.g., '00' or '10' shown in FIG. 21), terminal 200 can receive signals without being aware of single antenna port transmission that performs feedback-based precoding or transmission diversity using single antenna port. Thus, in this case, base station 100 may use any transmission method for terminal 200 for which the antenna port is configured.

It can be said that switching between antenna ports in the present embodiment is applied by replacing switching between single antenna port transmission and diversity using multiple antenna ports according to Embodiments 1 to 5 with switching between antenna ports 7, 8, 9 and 10 to be used for single antenna port transmission and antenna ports 7 and 9 to be used for single antenna port transmission with limited antenna ports.

In the present embodiment, a change in the number of antenna ports may be indicated from base station 100 to terminal 200 so as to switch among three transmission methods: single antenna port transmission, transmission diversity using multiple antenna ports, and transmission diversity using single antenna port.

For example, when channel quality is extremely poor, transmission diversity using single antenna port with high RS channel estimation accuracy is appropriate. On the other hand, when channel estimation accuracy can be secured but channel quality is poor to a certain degree, transmission diversity using multiple antenna ports is appropriate. When channel quality is good and the moving speed of terminal 200 is relatively slow, obtaining a frequency scheduling gain by single antenna port transmission that performs feedback-based precoding is appropriate. Base station 100 may indicate an ePDCCH candidate number corresponding to a position of switching between these transmission methods.

Figure 22:
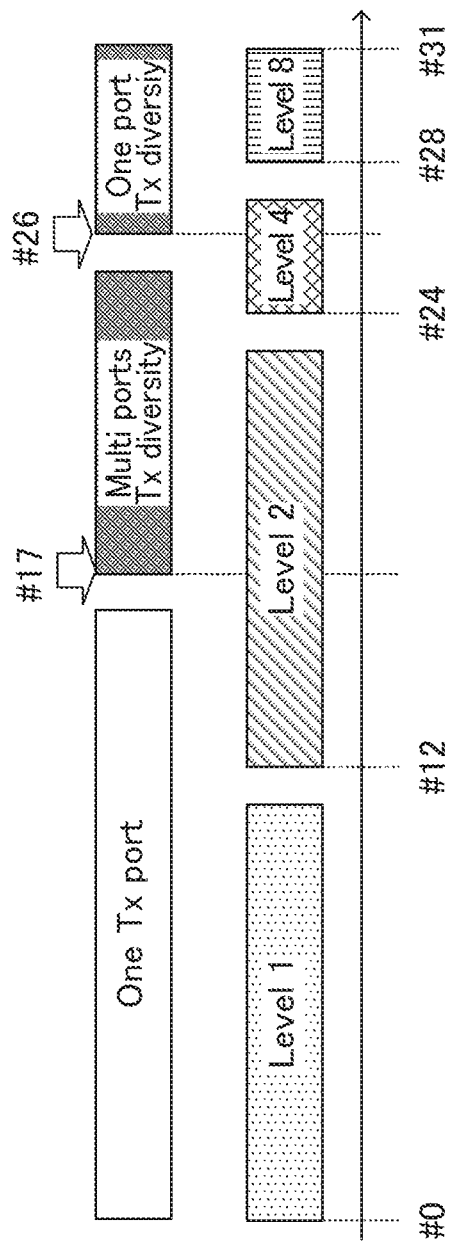
FIG. 22 illustrates an example of switching between transmission methods according to Embodiment 6 of the present invention.

In an example shown in FIG. 22, base station 100 indicates ePDCCH candidate numbers #17 and #26 to terminal 200. Thus, as shown in FIG. 22, terminal 200 performs blind decoding assuming single antenna port transmission with ePDCCH candidate numbers #0 to #16, assuming transmission diversity using multiple antenna ports with ePDCCH candidate numbers #17 to #25 and assuming transmission diversity using single antenna port with ePDCCH candidate numbers #26 to #31.

When the total number of ePDCCH candidates is assumed to be N, the number of bits necessary to indicate an ePDCCH candidate which becomes the above-described reference for switching between transmission methods is 2*ceil ($\log_2$(N+1)) bits. For example, since N=32 in FIG. 22, 2*ceil ($\log_2$(N+1))=12 bits. When two indications from base station 100 to terminal 200 are both #N (#32 in FIG. 22), the transmission method for all ePDCCH candidates may be assumed to be single antenna port transmission and when the two indications are both #0, the transmission method for all ePDCCH candidates may be assumed to be transmission diversity using single antenna port.

In FIG. 22, as in the case of Embodiment 1, in order to allow the antenna port for single antenna port transmission to uniquely identify antenna ports for transmission diversity using multiple antenna ports, antenna ports to be used for both transmission methods may be associated with each other beforehand (e.g., see FIG. 13). Alternatively, only the same antenna ports may be configured beforehand to be always used as antenna ports for transmission diversity using multiple antenna ports.

Although a case has been described in the present embodiment where 32 ePDCCH candidates are used as shown, for example, in FIG. 22, the number of ePDCCH candidates is not limited to 32. As in the case of Embodiment 1, ePDCCH candidates for which transmission methods are switched may be a region, to the whole of which control information relating to downlink (DL) is mapped or may be a region, to the whole of which control information relating to uplink (UL) is mapped or may be a region in which a region to which control information relating to downlink (DL) is mapped and a region to which control information relating to uplink (UL) is mapped are mixed. For example, the numbers of ePDCCH candidates corresponding to downlink control information for aggregation levels 1, 2, 4 and 8 may be assumed to be 6, 6, 2 and 2 respectively and the numbers of ePDCCH candidates corresponding to control information of uplink control information may be assumed to be 6, 6, 2 and 2 respectively. As in the case of FIG. 22, the total number of ePDCCH candidates in this case is also 32.

The ePDCCH candidates for which transmission methods are switched may be a region that makes up a search space (UE-SS) specific to terminal 200 or may be a region that makes up a search space (C-SS) common to a plurality of terminals 200 or may be a region in which the regions making up UE-SS and C-SS respectively are mixed.

Each embodiment of the present invention has been described thus far.

Other Embodiments

[1]

In each of the embodiments described above, the term "antenna port" refers to a logical antenna including one or more physical antennas. In other words, the term "antenna port" does not necessarily refer to a single physical antenna, and sometimes refers to an array antenna including a plurality of antennas, for example.

For example, in 3GPP LTE, how many physical antennas are included in the antenna port is not defined, but the antenna port is defined as the minimum unit allowing the base station to transmit a different reference signal.

In addition, an antenna port may be specified as a minimum unit to be multiplied by a precoding vector weighting.

[2]

In each embodiment described above, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

A reception apparatus according to the present disclosure includes: a reception section that receives a signal mapped to one of a plurality of mapping candidates; and a processing section that performs blind decoding on the plurality of mapping candidates using one of a first transmission method using a single antenna port to perform precoding based on feedback information from a reception apparatus in accordance with an aggregation level configured for each of the plurality of mapping candidates, and a second transmission method to perform transmission diversity using multiple antenna ports.

In the reception apparatus according to this disclosure, the processing section performs blind decoding on a mapping candidate corresponding to an aggregation level lower than a predetermined value among the plurality of mapping candidates using the first transmission method and performs blind decoding on a mapping candidate corresponding to an aggregation level equal to or higher than the predetermined value using the second transmission method.

In the reception apparatus according to this disclosure, the mapping candidates are assigned numbers in ascending order from a mapping candidate corresponding to a lower aggregation level, the reception section receives a first number assigned to a mapping candidate corresponding to a position of switching between transmission methods among the numbers assigned to the plurality of mapping candidates, and the processing section performs blind decoding on a mapping candidate assigned a number lower than the first number using the first transmission method and performs blind decoding on a mapping candidate assigned a number equal to or greater than the first number using the second transmission method.

In the reception apparatus according to this disclosure, the mapping candidates are assigned numbers in ascending order from a mapping candidates corresponding to an aggregation level lower than L (L is a natural number) to a mapping candidate corresponding to an aggregation level equal to or higher than L; the reception section receives a first number assigned to a mapping candidate corresponding to a position of switching between transmission methods among the numbers assigned to the plurality of mapping candidates; and the processing section performs blind decoding on a mapping candidate assigned a number lower than the first number using the first transmission method and performs blind decoding on a mapping candidate assigned a number equal to or greater than the first number using the second transmission method.

In the reception apparatus according to this disclosure, when the plurality of aggregation levels are included in the aggregation level equal to or higher than L, the reception section performs blind decoding using one of the first transmission method and the second transmission method at the plurality of aggregation levels.

In the reception apparatus according to this disclosure, a second number indicating a number assigned to a mapping candidate corresponding to a position of switching between different aggregation levels is configured to be variable among the plurality of mapping candidates.

In the reception apparatus according to this disclosure, the second number is configured so that a ratio of a number of mapping candidates corresponding to more frequently used aggregation levels to a total number of the plurality of mapping candidates is higher.

In the reception apparatus according to this disclosure, the reception section receives the second number; and the processing section configures an aggregation level for each of the plurality of mapping candidates based on the second number.

In the reception apparatus according to this disclosure, the plurality of mapping candidates comprise a first mapping candidate group to which a signal specific to each reception apparatus is mapped and a second mapping candidate group to which a signal common to a plurality of reception apparatuses or a signal specific to each reception apparatus is mapped; in the first mapping candidate group, a mapping candidate is assigned a number in ascending order from a mapping candidate corresponding to a lower aggregation level; and in the second mapping candidate group, a mapping candidate is assigned a number greater than a maximum number assigned to a mapping candidate included in the first mapping candidate group in ascending order from a mapping candidate corresponding to a lower aggregation level.

In the reception apparatus according to this disclosure, the plurality of mapping candidates comprise a first mapping candidate group to which a signal specific to each reception apparatus is mapped and a second mapping candidate group to which a signal common to a plurality of reception apparatuses or a signal specific to each reception apparatus is mapped; in the first mapping candidate group, a mapping candidate is assigned a number in ascending order from a mapping candidate corresponding to an aggregation level lower than L; and in the second mapping candidate group, a mapping candidate is assigned a number greater than a maximum number assigned to a mapping candidate included in the first mapping candidate group in ascending order from a mapping candidate corresponding to an aggregation level equal to or greater than L.

In the reception apparatus according to this disclosure, the signal is transmitted using one of a plurality of formats; the plurality of mapping candidates are associated with the plurality of formats respectively; and the processing section performs blind decoding on only the formats associated with the plurality of mapping candidates.

A transmission apparatus according to the present disclosure includes: a precoding section that performs precoding on a signal mapped to one of a plurality of mapping candidates using one of a first transmission method using a single antenna port to perform precoding based on feedback information from a reception apparatus in accordance with an aggregation level configured for each of the plurality of mapping candidates, and a second transmission method that performs transmission diversity using multiple antenna ports; and a transmission section that transmits the precoded signal.

A reception method according to the present disclosure includes: receiving a signal mapped to one of a plurality of mapping candidates; and performing blind decoding on the plurality of mapping candidates using one of a first transmission method using a single antenna port to perform precoding based on feedback information from a reception apparatus in accordance with an aggregation level configured for each of the plurality of mapping candidates, and a second transmission method to perform transmission diversity using multiple antenna ports.

A transmission method according to the present disclosure includes: performing precoding on a signal mapped to one of a plurality of mapping candidates using one of a first transmission method using a single antenna port to perform precoding based on feedback information from a reception apparatus in accordance with an aggregation level configured for each of the plurality of mapping candidates, and a second transmission method that performs transmission diversity using multiple antenna ports; and transmitting the precoded signal.

The disclosures of the specifications, the drawings, and the abstracts included in Japanese Patent Applications No. 2012-031653 filed on Feb. 16, 2012, and No. 2012-055433 filed on Mar. 13, 2012 are incorporated herein by reference in their entireties.

INDUSTRIAL APPLICABILITY

The present invention is useful in mobile communication systems.

REFERENCE SIGNS LIST

100 Base station
200 Terminal
101 Assignment information generation section
102 Configuration section
103, 206 Error correction coding section
104, 207 Modulation section
105 Precoding section
106, 208 Signal assignment section
107, 209 Transmission section
108, 201 Reception section
109, 203 Demodulation section
110, 204 Error correction decoding section
202 Signal separating section
205 Control signal processing section

The invention claimed is:

1. An integrated circuit comprising:
circuitry, which, in operation, controls
mapping a precoded downlink control signal to one of a plurality of mapping candidates,
wherein the precoded downlink control signal is prepared using a first precoding for single-antenna port transmission with a single antenna port in localized allocation mode,
wherein the precoded downlink control signal is prepared using a second precoding for multi-antenna ports transmission with two antenna ports in distributed allocation mode, and
wherein the plurality of mapping candidates is comprised of a plurality of aggregation levels, and one or more of the aggregation levels that is higher than a boundary among the plurality of aggregation levels is associated with only the multi-antenna ports transmission, the boundary being determined based on signaling indicated from the base station apparatus; and
transmitting the precoded downlink control signal.

2. The integrated circuit according to claim 1, wherein the second precoding for the multi-antenna ports transmission is a precoding for transmission diversity.

3. The integrated circuit according to claim 1, wherein three or more antenna ports provide several subsets of antenna ports, and one of the several subsets of antenna ports is used in the distributed allocation mode.

4. The integrated circuit according to claim 1, wherein resources in the localized allocation mode are localized in a frequency domain, and resources in the distributed allocation mode are distributed in the frequency domain.

5. The integrated circuit according to claim 1, wherein a plurality of first aggregation levels used in the distributed allocation mode at least partially overlaps with a plurality of second aggregation levels used in the localized allocation mode and includes at least one more aggregation level that is higher than any one of the second aggregation levels.

6. The integrated circuit according to claim 1, comprising at least one input node, which, in operation, inputs data.

7. The integrated circuit according to claim 1, comprising at least one output node, which, in operation, outputs data.

8. An integrated circuit comprising:
mapping circuitry, which, in operation, maps a precoded downlink control signal to one of a plurality of mapping candidates,
wherein the precoded downlink control signal is prepared using a first precoding for single-antenna port transmission with a single antenna port in localized allocation mode, and
wherein the precoded downlink control signal is prepared using a second precoding for multi-antenna ports transmission with two antenna ports in distributed allocation mode, and
wherein a plurality of first aggregation levels used in the distributed allocation mode at least partially overlaps with a plurality of second aggregation levels used in the localized allocation mode and includes at least one more aggregation level that is higher than any one of the second aggregation levels; and
transmission circuitry, which, in operation, transmits the precoded downlink control signal.

9. The integrated circuit according to claim 8, wherein the second precoding for the multi-antenna ports transmission is a precoding for transmission diversity.

10. The integrated circuit according to claim 8, wherein resources in the localized allocation mode are localized in a frequency domain, and resources in the distributed allocation mode are distributed in the frequency domain.

11. An integrated circuit comprising:
mapping circuitry, which, in operation, maps a precoded downlink control signal to one of a plurality of mapping candidates,
wherein the precoded downlink control signal is prepared using a first precoding for single-antenna port transmission with a single antenna port in localized allocation mode, and wherein the precoded downlink control signal is prepared using a second precoding for multi-antenna ports transmission with two antenna ports in distributed allocation mode; and transmission circuitry, which, in operation, transmits the precoded downlink control signal, wherein three or more antenna ports provide several subsets of antenna ports, and one of the several subsets of antenna ports is used in the distributed allocation mode.

* * * * *